(12) United States Patent
Yamamoto et al.

(10) Patent No.: US 8,098,756 B2
(45) Date of Patent: Jan. 17, 2012

(54) MIMO ANTENNA APPARATUS CAPABLE OF DIVERSITY RECEPTION USING ONE RADIATING CONDUCTOR

(75) Inventors: Atsushi Yamamoto, Kyoto (JP); Hiroshi Iwai, Osaka (JP); Satoru Amari, Osaka (JP); Tsutomu Sakata, Osaka (JP)

(73) Assignee: Panasonic Corporation, Osaka (JP)

( * ) Notice: Subject to any disclaimer, the term of this patent is extended or adjusted under 35 U.S.C. 154(b) by 192 days.

(21) Appl. No.: 12/670,200

(22) PCT Filed: May 19, 2009

(86) PCT No.: PCT/JP2009/002199
§ 371 (c)(1),
(2), (4) Date: Jan. 22, 2010

(87) PCT Pub. No.: WO2009/142000
PCT Pub. Date: Nov. 26, 2009

(65) Prior Publication Data
US 2010/0195753 A1    Aug. 5, 2010

(30) Foreign Application Priority Data
May 22, 2008    (JP) ................................. 2008-133939

(51) Int. Cl.
*H04L 1/02* (2006.01)
*H04B 7/02* (2006.01)
(52) U.S. Cl. ........ 375/267; 375/316; 375/347; 370/334; 455/101; 343/770
(58) Field of Classification Search .................. 375/267, 375/316, 347; 455/101; 370/334; 343/770
See application file for complete search history.

(56) References Cited

U.S. PATENT DOCUMENTS
| 7,053,848 B2* | 5/2006 | Shoji et al. ..................... 343/770 |
| 7,778,147 B2* | 8/2010 | Forenza et al. ................ 370/204 |
| 7,864,121 B2* | 1/2011 | Suprunov et al. ............. 343/702 |
| 2004/0239575 A1 | 12/2004 | Shoji et al. |

FOREIGN PATENT DOCUMENTS
| JP | 8-97760 | 4/1996 |
| JP | 2004-56421 | 2/2004 |

(Continued)

OTHER PUBLICATIONS

International Search Report issued Aug. 25, 2009 in International (PCT) Application No. PCT/JP2009/002199.

(Continued)

*Primary Examiner* — Ted Wang
(74) *Attorney, Agent, or Firm* — Wenderoth, Lind & Ponack, L.L.P.

(57) ABSTRACT

A MIMO antenna apparatus is provided with: an upper housing having slits; first feed points through which the upper housing itself is excited as first antennas; second feed points through which the slits are excited as second antennas; switch, each of which is connected to one of the first feed points and one of the second feed points, and connects one of the two feed points to an A/D converter circuit-; a signal level detector circuit detecting signal levels of received radio signals; and a controller that controls the switches to change a feed point connected to the A/D converter circuit, when the detected signal level is less than or equal to a predetermined threshold value. The slits are located between the first antennas.

11 Claims, 21 Drawing Sheets

| | FOREIGN PATENT DOCUMENTS | |
|---|---|---|
| JP | 2004-129234 | 4/2004 |
| JP | 2005-236884 | 9/2005 |
| JP | 2005-347958 | 12/2005 |
| JP | 2006-166261 | 6/2006 |
| JP | 2008-60907 | 3/2008 |
| WO | 2008/047441 | 4/2008 |

OTHER PUBLICATIONS

International Preliminary Report on Patentability issued Jan. 20, 2011 in International (PCT) Application No. PCT/JP2009/002199.

* cited by examiner

MIMO ANTENNA APPARATUS CAPABLE OF DIVERSITY RECEPTION USING ONE RADIATING CONDUCTOR

TECHNICAL FIELD

The present invention relates to an antenna apparatus for use in a wireless communication apparatus, which is used in mobile communication using a mobile phone or the like, and is controlled to maintain good communication quality as well as achieve high-speed communication with increased communication capacity. More particularly, the present invention relates to a MIMO (Multi-Input Multi-Output) antenna apparatus capable of simultaneously transmitting and/or receiving radio signals of multiple channels using multiple antenna elements, and relates to a wireless communication apparatus provided with the MIMO antenna apparatus.

BACKGROUND ART

As an antenna apparatus using multiple antenna elements and selectively switching among them, for example, a diversity antenna apparatus disclosed in Patent Literature 1 has been known.

The diversity antenna apparatus of Patent Literature 1 is provided with impedance adjustment units each disposed between one of two antennas as a diversity antenna and a switching circuit. The impedance adjustment units provide an adjustment for an antenna disconnected by the switching circuit, such that the switching circuit side terminates with no reflection as seen from the antenna. Thus, high isolation between the antennas can be achieved.

As described above, according to Patent Literature 1, it is possible to provide a diversity antenna apparatus capable of suppressing re-radiation from a disconnected antenna by means of no reflection provided by a corresponding impedance adjustment unit, and thus achieving good isolation characteristics between two antennas.

Further, as a conventional antenna apparatus provided with an array antenna made of a loop antenna and a monopole antenna, there is, for example, an antenna apparatus disclosed in Patent Literature 2.

The antenna apparatus of Patent Literature 2 is provided with a diversity antenna made of a loop antenna and a monopole antenna, and thus achieves high isolation, and simultaneously achieves low correlation through different directivities and different polarizations. The high isolation between the antennas yields an improvement in radiation efficiency, and the low correlation yields a high diversity characteristic. Accordingly, a high diversity effect can be obtained.

As described above, according to Patent Literature 2, it is possible to provide an antenna apparatus with a loop antenna and a monopole antenna, capable of achieving high isolation and low correlation and thus obtaining a high diversity effect, despite the arrangement of the two antennas close to each other.

CITATION LIST

Patent Literature

PATENT LITERATURE 1: Japanese Patent Laid-open Publication No. 2005-236884.
PATENT LITERATURE 2: Japanese Patent Laid-open Publication No. 2005-347958.

SUMMARY OF INVENTION

Technical Problem

The conventional diversity antenna apparatus disclosed in Patent Literature 1 has the following problem. In this conventional example, a diversity antenna apparatus is disclosed in which an impedance adjustment unit is adjusted such that no reflection occurs at an antenna terminal disconnected by a switching circuit, for the purpose of high isolation between multiple antennas to be changed through the switching circuit. However, the technique for achieving high isolation in the diversity antenna apparatus of Patent Literature 1 has a problem that the technique can not be applied to a MIMO antenna using multiple antennas simultaneously without switching among them.

On the other hand, the antenna apparatus provided with a loop antenna and a monopole antenna, disclosed in Patent Literature 2, has the following problem. Since this conventional example uses a one-wavelength loop antenna, the antenna is limited in size. Thus, there is a drawback in that antenna size can not be reduced in a MIMO antenna with multiple antennas operating simultaneously. That is, this conventional antenna apparatus can not be configured in a small size, or can not be used in a battery-powered, small and portable radio apparatus.

An object of the present invention is therefore to solve the above-described problems, and to provide a MIMO antenna apparatus capable of high-quality and high-speed communication, by maintaining high isolation between antennas and maintaining suppressed low correlation between the antennas through different polarizations, even when the MIMO antenna apparatus has a small size, and to provide a mobile wireless communication apparatus provided with the MIMO antenna apparatus.

Solution to Problem

According to an aspect of the present invention, a MIMO antenna apparatus is provided with: a radiating conductor having a plurality of slits; a plurality of first feed points which are respectively provided on the radiating conductor, and through which the radiating conductor itself is excited as a plurality of different first antennas, respectively; a plurality of second feed points which are respectively provided at the plurality of slits, and through which the plurality of slits are excited as a plurality of second antennas, respectively; demodulation means for demodulating received radio signals by a MIMO (Multi-Input Multi-Output) scheme; a switching circuit including a plurality of switches, each switch connected to one of the first feed points and one of the second feed points, the switching circuit connecting one of two feed points connected to each switch, to the demodulation means; and control means for controlling the switches based on a first and a second signal measurement values of respective received radio signals. When the first signal measurement value of a radio signal received by an antenna associated with a feed point currently connected to the demodulation means by a first switch, which is any one of the switches, is less than or equal to a predetermined threshold value, the control means controls the first switch to change the feed point connected to the demodulation means, to the other feed point, and when the second signal measurement value after the change of the feed point has not improved over the second signal measurement value before the change of the feed point, the control means controls the first switch to change again the feed point connected to the demodulation means, to the other feed point.

In the MIMO antenna apparatus, at least one of the slits is located between at least two of the first antennas.

Moreover, in the MIMO antenna apparatus, the control means controls the switches to initially connect the first feed points to the demodulation means.

Further, the MIMO antenna apparatus is further provided with detection means for detecting signal levels of radio signals respectively received by antennas associated with feed points currently connected to the demodulation means by the switches. The first and the second signal measurement values are signal levels detected by the detection means.

Furthermore, the MIMO antenna apparatus is further provided with detection means for detecting signal levels of radio signals respectively received by the first and second antennas. The first and the second signal measurement values are signal levels detected by the detection means.

Moreover the MIMO antenna apparatus is further provided with: detection means for detecting signal levels of radio signals respectively received by antennas associated with feed points currently connected to the demodulation means by the switches; and decision means for deciding signal quality of the radio signals demodulated by the demodulation means. The first signal measurement value is a signal level detected by the detection means, and the second signal measurement value is signal quality decided by the decision means.

Further, the MIMO antenna apparatus is further provide with: detection means for detecting signal levels of radio signals respectively received by the first and second antennas; and decision means for deciding signal quality of the radio signals demodulated by the demodulation means. The first signal measurement value is a signal level detected by the detection means, and the second signal measurement value is signal quality decided by the decision means.

Furthermore, in the MIMO antenna apparatus, at least one of the slits has resonant frequency adjustment means for changing an operating frequency of the MIMO antenna apparatus to a predetermined frequency.

Moreover, the MIMO antenna apparatus is further provided with a ground conductor. The radiating conductor configures one of a planar inverted-F antenna and a planar inverted-L antenna, on the ground conductor.

According to another aspect of the present invention, a wireless communication apparatus is provided with the MIMO antenna apparatus.

Moreover, the wireless communication apparatus is a mobile phone.

Advantageous Effects of Invention

The present invention configured as described above can switches between antennas having different polarizations and provided on a single radiating conductor (i.e., the first antenna and the second antenna), thus avoiding high correlation, and avoiding an increase in size due to disposing multiple antennas. Further, each slit is used as means to be excited as an antenna and as means for obtaining high isolation (i.e., low coupling), thus achieving high isolation between the antennas and reduction in size. Accordingly, it is possible to provide a MIMO antenna apparatus capable of high-quality and high-speed communication, and a mobile wireless communication apparatus provided with the MIMO antenna apparatus.

Effects obtained by a representative one of the inventions disclosed herein will be briefly described below. In a small MIMO wireless communication terminal with multiple antennas operating simultaneously, the MIMO wireless communication terminal is provided with slits for achieving high isolation between the antennas. When the signal measurement value of a received signal of an antenna in which a radiating conductor itself is excited is less than or equal to a predetermined threshold value, feeding of the antenna is changed so as to feed through a slit, thus obtaining a diversity effect. Further, since the excitation of the radiating conductor itself and the excitation of a slit differ from each other in the polarization of radio waves to be transmitted and received, it is also possible to expect a reduction in correlation coefficient between the antennas. Accordingly, it is possible to achieve high-quality and high-speed communication. As described above, it is possible to overcome a problem of degradation in radiation efficiency caused by closely arranged antenna elements when providing multiple antennas in a small terminal, and it is also possible to suppress variations in received power due to fading, which is a problem in mobile communication, by using a diversity effect, thus achieving high-speed communication as fast as possible with limited size.

DESCRIPTION OF EMBODIMENTS

Figure 1:
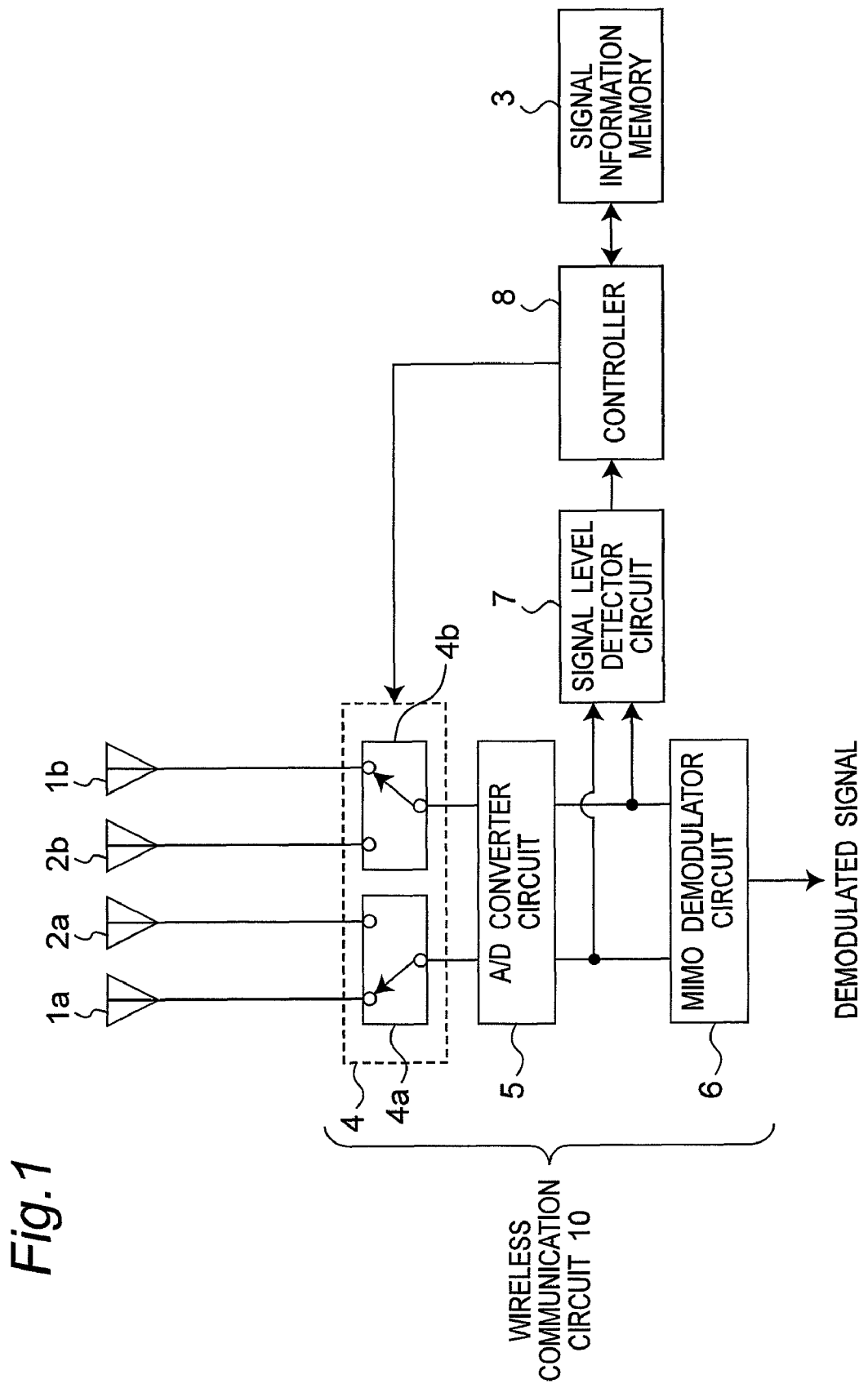
FIG. 1 is a block diagram showing a configuration of a MIMO antenna apparatus according to a first preferred embodiment of the present invention.

Preferred embodiments of the present invention will be described in detail below with reference to the drawings. Note that components having similar functions are denoted by the same reference numerals throughout the drawings illustrating the preferred embodiments of the present invention, and are not explained again.

First Preferred Embodiment

Figure 2:
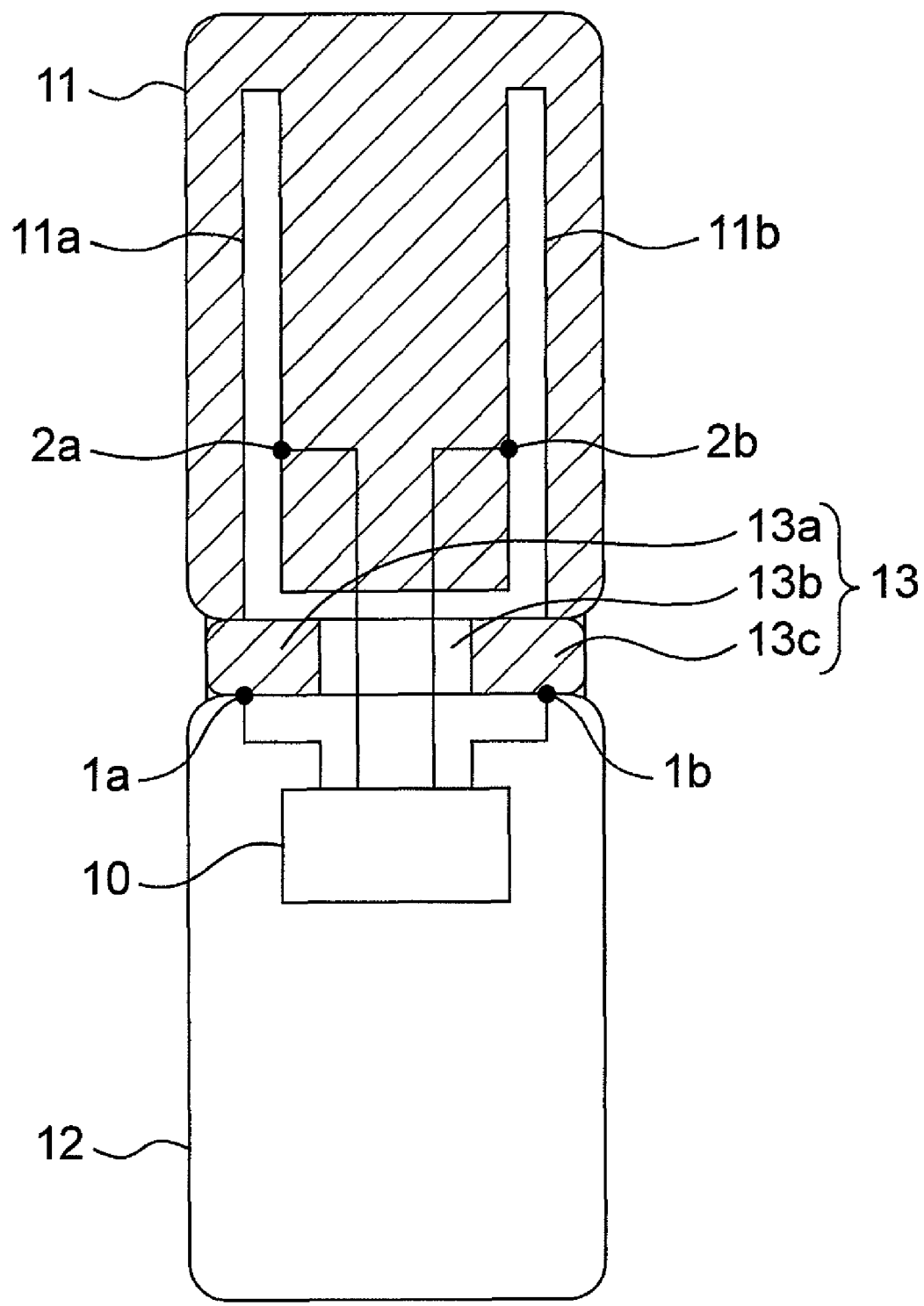
FIG. 2 is a schematic diagram showing an internal configuration of a portable wireless communication apparatus provided with a MIMO antenna apparatus according to an implementation example of the first preferred embodiment of the present invention, by removing a surface of a housing of the portable wireless communication apparatus.

FIG. 1 is a block diagram showing a configuration of a MIMO antenna apparatus according to a first preferred embodiment of the present invention. FIG. 2 is a schematic diagram showing an internal configuration of a portable wireless communication apparatus provided with a MIMO antenna apparatus according to an implementation example of the first preferred embodiment of the present invention, by removing a surface of a housing of the portable wireless communication apparatus. The MIMO antenna apparatus of the present preferred embodiment is provided with: an upper housing 11 as a radiating conductor having a plurality of slits 11a and 11b as shown in FIG. 2; a plurality of first feed points which are provided on the radiating conductor, and through which the radiating conductor itself is excited as different antennas 1a and 1b, respectively; a plurality of second feed points which are respectively provided at the slits 11a and 11b, and through which the slits 11a and 11b are excited as antennas 2a and 2b, respectively; a plurality of switch 4a and 4b, each of which is connected to one of the first feed points and one of the second feed points, and connects one of the two feed points to an analog/digital (A/D) converter circuit 5 and a MIMO demodulator circuit 6; a signal level detector circuit 7 detecting signal levels of radio signals received by the antennas 1a, 1b, 2a, and 2b, respectively; and a controller 8 that controls the switches 4a and 4b to change a feed point connected to the A/D converter circuit 5 and the MIMO demodulator circuit 6, when a detected signal level of a radio signal received by an antenna associated with the feed point connected to the A/D converter circuit 5 and the MIMO demodulator circuit 6 is less than or equal to a predetermined threshold value. The slits 11a and 11b are located between the antennas 1a and 1b.

The MIMO antenna apparatus of the present preferred embodiment is provided with: two antennas 1a and 1b, each of which is a planar antenna; and other two antennas 2a and 2b, each of which is a slit antenna. The MIMO antenna apparatus selectively uses the antennas 1a and 2a by switching between them, and selectively uses the antennas 1b and 2b by switching between them, thus achieving the diversity reception in MIMO communication with two data streams. In this case, the antennas 1a, 1b, 2a, and 2b are provided on a single radiating conductor or metal housing with a certain area.

Referring to FIG. 1, the MIMO antenna apparatus is provided with four antennas 1a, 1b, 2a, and 2b, a switching circuit 4, an A/D converter circuit 5, a MIMO demodulator circuit 6, a signal level detector circuit 7, a controller 8, and a signal information memory 3. At the antennas 1a, 1b, 2a, and 2b arrive radio signals containing two MIMO data streams, transmitted from a MIMO sender-side base station apparatus (not shown) using a certain MIMO modulation scheme. The switching circuit 4 includes a switch 4a connected to the antennas 1a and 2a and the A/D converter circuit 5, and includes a switch 4b connected to the antennas 1b and 2b and the A/D converter circuit 5, and connects one of the antennas 1a and 2a and one of the antennas 1b and 2b to the A/D converter circuit 5 under the control of the controller 8. The A/D converter circuit 5 performs A/D conversion on each of two received signals from the switching circuit 4, and passes the two converted received signals to the MIMO demodulator circuit 6 and the signal level detector circuit 7. The signal level detector circuit 7 detects signal levels of the respective two received signals, and passes the detection results to the controller 8. The signal levels are detected in the form of, e.g., received power, or a carrier-power to noise-power ratio (CNR). The controller 8 performs a MIMO adaptive control process to control the switching circuit 4, as described later with reference to FIGS. 5 to 8, based on the detected signal levels, thus achieving the diversity reception with changing the antennas 1a, 1b, 2a, and 2b from one another. The signal information memory 3 is used by the controller 8 to store signal levels of the respective antennas, which are used during the MIMO adaptive control process. The MIMO demodulator circuit 6 performs a MIMO demodulation process on two received signals and outputs one demodulated signal.

Referring to FIG. 2, a portable wireless communication apparatus of the present implementation example is configured as a foldable mobile phone, which includes a upper housing 11 and a lower housing 12, each being shaped in a substantially rectangular parallelepiped, and in which the upper housing 11 and the lower housing 12 are connected to each other through a hinge portion 13. Preferably, the upper housing 11 is provided with a speaker and a display, and the lower housing 12 is provided with a keyboard and a microphone, but these components are not shown. The upper housing 11 is made of metal, and the lower housing 12 is preferably made of a dielectric material. The hinge portion 13 includes a left hinge portion 13a and a right hinge portion 13c, each made of metal, and each mechanically and electrically connected to the upper housing 11; and further includes a central hinge portion 13b made of a dielectric material and mechanically connected to the lower housing 12. The central hinge portion 13b fits between the left hinge portion 13a and the right hinge portion 13c. The left hinge portion 13a, the central hinge portion 13b, and the right hinge portion 13c are connected so as to rotate about a shaft (not shown) extending through the left hinge portion 13a, the central hinge portion 13b, and the right hinge portion 13c. The upper housing 11 has multiple feed points, and operates as antennas 1a, 1b, 2a, and 2b by exciting through the respective feed points. Feed points associated with the antennas 1a and 1b are provided at, e.g., a lower left portion and a lower right portion of the upper housing 11, respectively. Particularly, in the present preferred embodiment, such feed points are respectively provided at the left hinge portion 13a and the right hinge portion 13c which are electrically connected to the upper housing 11 (in FIG. 2, the positions of these feed points are indicated by reference numerals 1a and 1b). The upper housing 11 operates as a planar and electric current antenna by exciting the upper housing 11 through a feed point associated with the antenna 1a. Similarly, the upper housing 11 operates as another planar and electric current antenna by exciting the upper housing 11 through a feed point associated with the antenna 1b. The upper housing 11 is configured to operate at a desired operating frequency by exciting through feed points associated with the respective antennas 1a and 1b. The upper housing 11 also has slits 11a and 11b spaced apart from each other by a certain distance. Each of the slits 11a and 11b is configured as a one-end open transmission line resonator with an opening located between the feed points associated with the antennas 1a and 1b. Feed points associated with the antennas 2a and 2b are provided at certain positions along the slits 11a and 11b, respectively (in FIG. 2, the positions of these feed points are indicated by reference numerals 2a and 2b). The slit 11a operates as a slit and magnetic current antenna by exciting the slit 11a through a feed point associated with the antenna 2a. Similarly, the slit 11b operates as a slit and magnetic current antenna by exciting the slit 11b through a feed point associated with the antenna 2b. Each of the slits 11a and 11b has a slit length of about ¼ of the operating wavelength. The slits 11a and 11b are configured to operate at a desired operating frequency by exciting through feed points associated with the respective antennas 2a and 2b. The slits 11a and 11b provided substantially between the antennas 1a and 1b result in high isolation between the antennas 1a and 1b. The feed points associated with the respective antennas 1a, 1b, 2a, and 2b are connected to the wireless communication circuit 10 provided in the lower housing 12. As shown in FIG. 1, the wireless communication circuit 10 includes the switching circuit 4, the analog/digital (A/D) converter circuit 5, the MIMO demodulator circuit 6, the signal level detector circuit 7, the controller 8, and the signal information memory 3.

Figure 3:
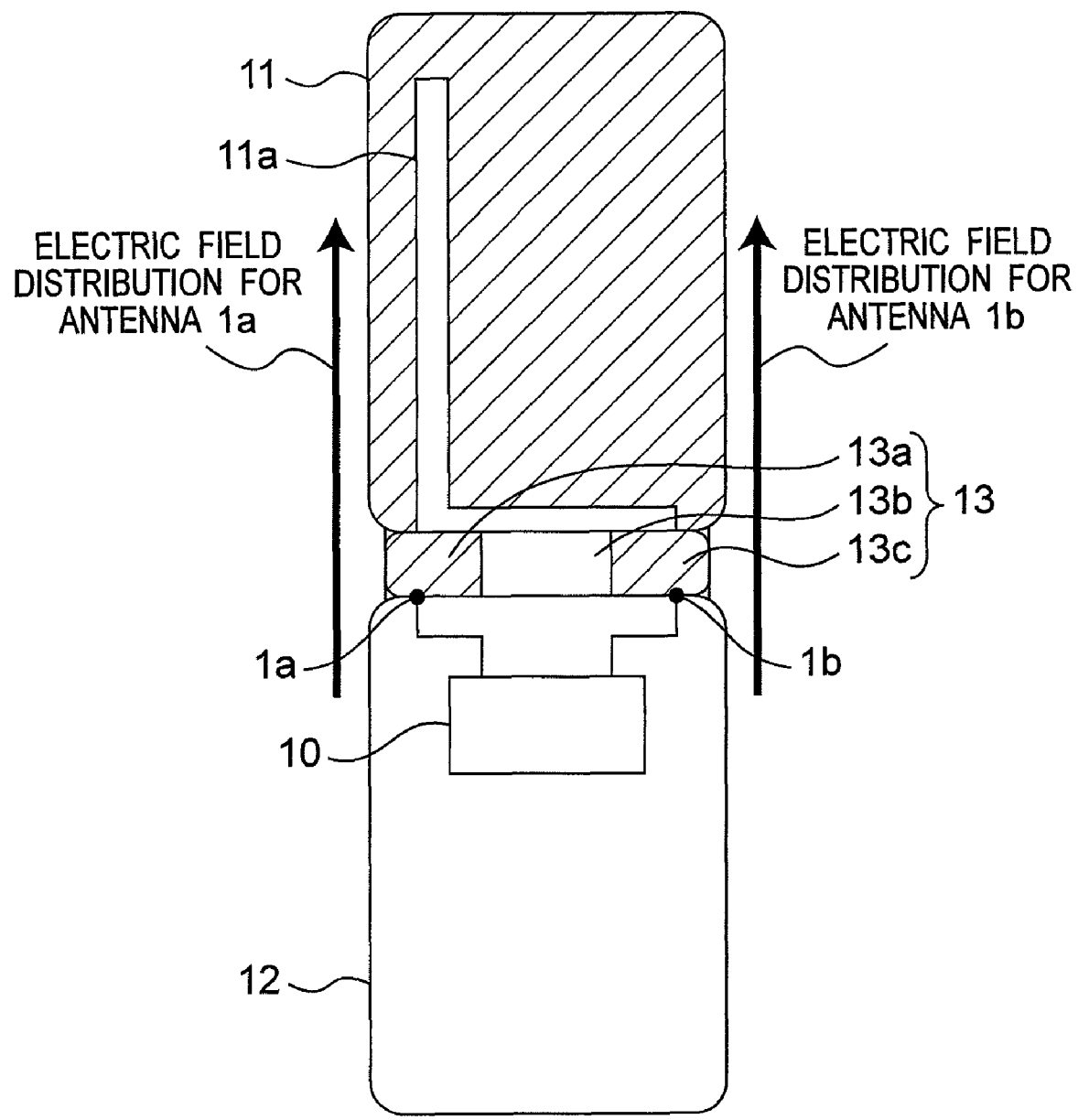
FIG. 3 is a schematic diagram showing excitation of an upper housing 11 through feed points associated with respective antennas 1a and 1b in the portable wireless communication apparatus of FIG. 2.

FIG. 3 is a schematic diagram showing the excitation of the upper housing 11 through feed points associated with the respective antennas 1a and 1b in the portable wireless communication apparatus of FIG. 2. Arrows indicate electric field distributions for the antennas 1a and 1b, respectively. According to the configuration of the present preferred embodiment, providing the slit 11a results in high isolation between the antennas 1a and 1b. Although FIG. 3 shows only the slit 11a for ease of illustration, high isolation between the antennas 1a and 1b is achieved also in the case of providing only the slit 11b, and in the case of providing both the slits 11a and 11b.

Figure 4:
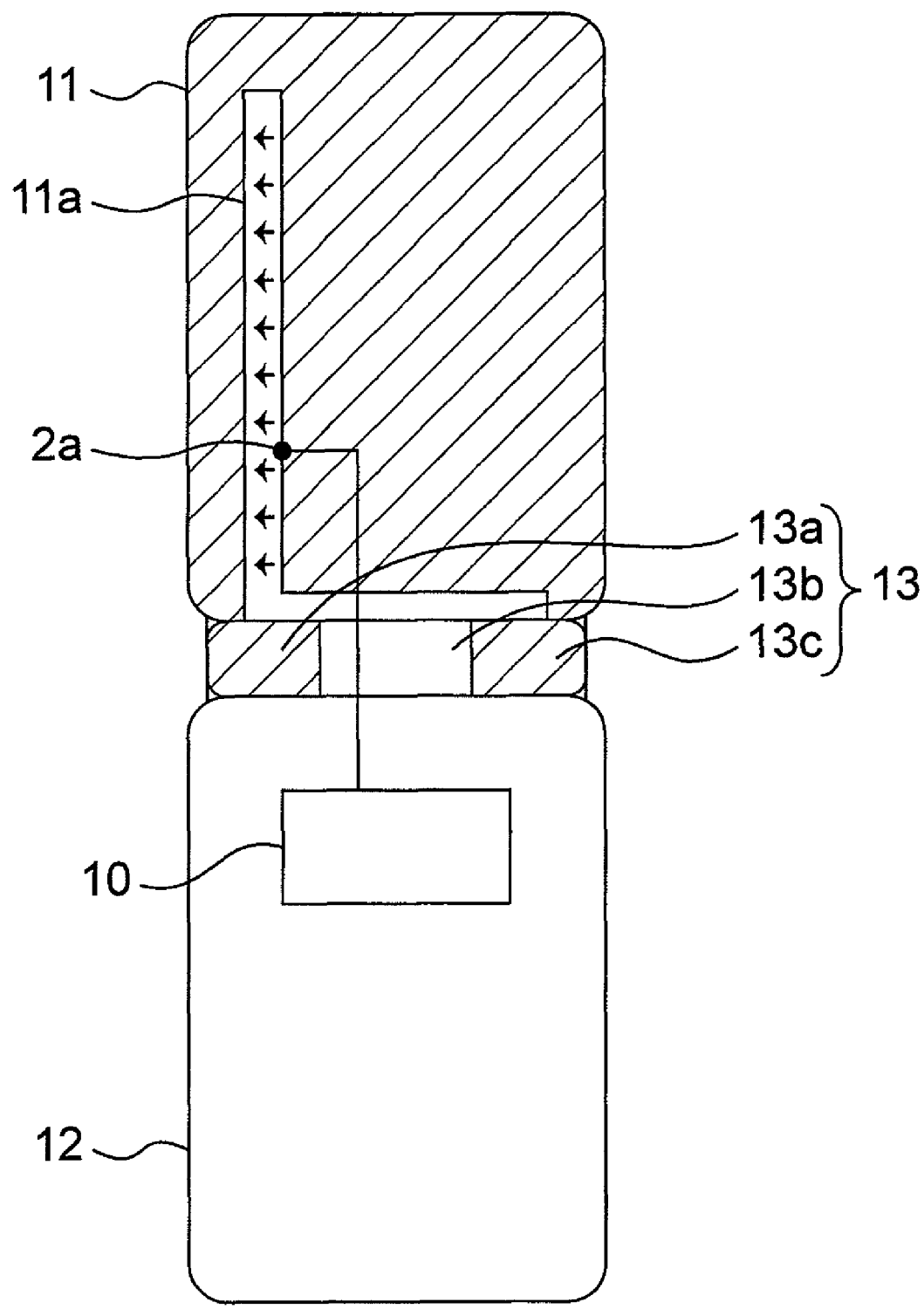
FIG. 4 is a schematic diagram showing excitation of a slit 11a through a feed point associated with an antenna 2a in the portable wireless communication apparatus of FIG. 2.
Figure 5:
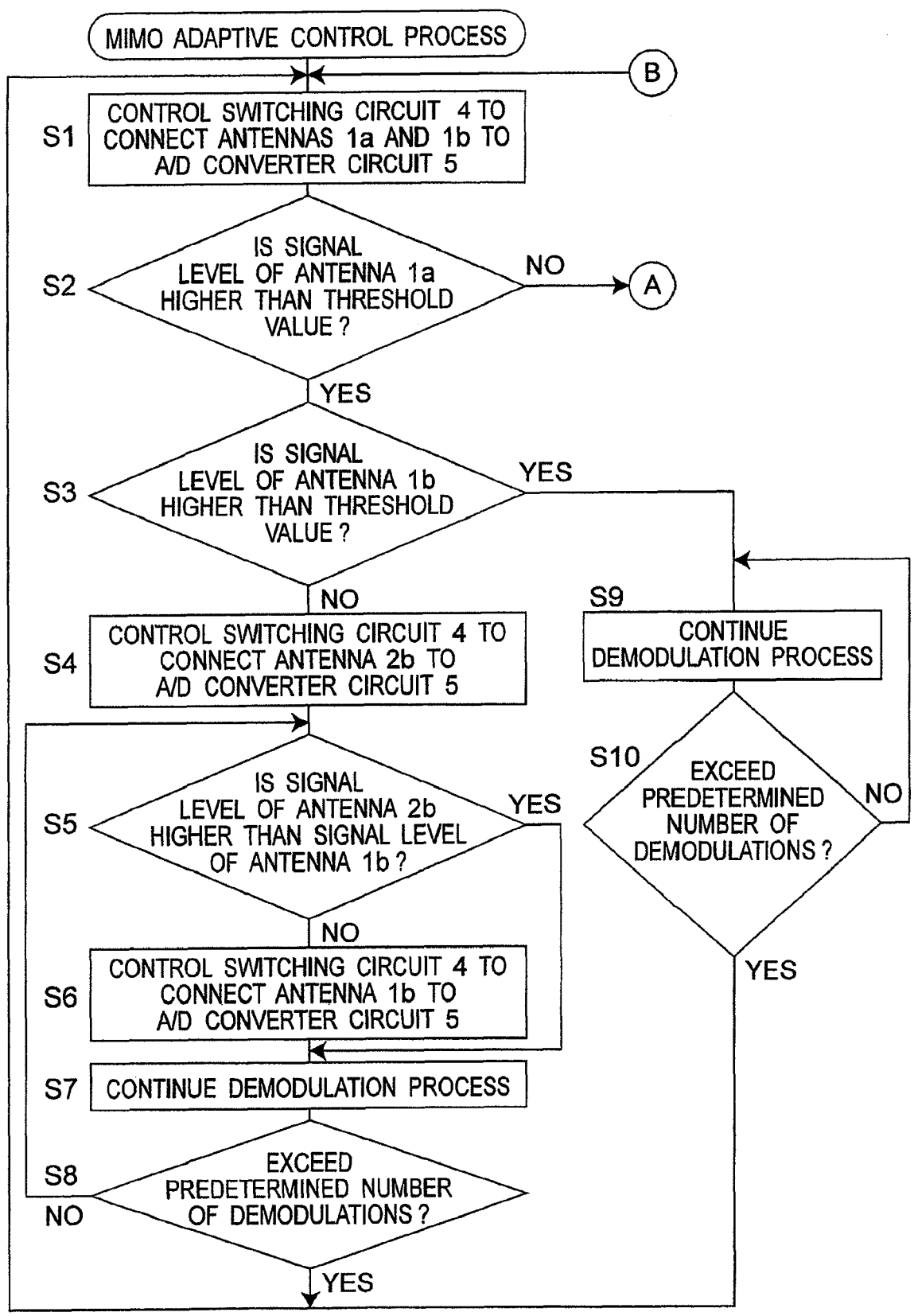
FIG. 5 is a flowchart showing a first part of a MIMO adaptive control process performed by a controller 8 of FIG. 1.

FIG. 4 is a schematic diagram showing the excitation of the slit 11a through a feed point associated with the antenna 2a in the portable wireless communication apparatus of FIG. 2. Although in the case of FIG. 3 the slit 11a is used to provide high isolation between the antennas 1a and 1b, the slit 11a operates as a ¼ wavelength slit antenna by feeding in the manner as shown in FIG. 4. Therefore, the MIMO antenna apparatus of the present preferred embodiment can operate as a diversity antenna by changing the antenna to be fed from the antenna 1a (planar antenna) to the antenna 2a (slit antenna) by means of the switch 4a of the switching circuit 4. In a MIMO antenna apparatus with multiple antennas operating simultaneously, deterioration of the transmission and reception characteristics of one antenna directly leads to deterioration of MIMO wireless communication characteristics. Hence, according to the configuration of the present preferred embodiment, the switching diversity is achieved by changing each of the antennas 1a and 1b with the corresponding slit antenna (i.e., the antennas 2a and 2b), deterioration of reception characteristics is prevented. Accordingly, it is possible to maintain good MIMO wireless communication even on the move. In addition, by exciting only one of the slits 2a and 2b and not exciting the other, it is possible to maintain good MIMO wireless communication and simultaneously achieve high isolation. Further, an electric field distribution of the slit 11a being excited is parallel to a short side of the slit 11a, as shown by arrows of FIG. 4, and thus is perpendicular to the electric field distributions for the antennas 1a and 1b shown in FIG. 3. That is, radio waves to be transmitted and received by the antennas 2a and 2b as slit antennas are perpendicular to radio waves to be transmitted and received by the antennas 1a and 1b as planar antennas. Hence, a signal received by the antenna 1a as a planar antenna is less correlated with a signal received by the antenna 2b as a slit antenna, and a signal received by the antenna 1b as a planar antenna is less correlated with a signal received by the antenna 2a as a slit antenna. Accordingly, the MIMO antenna apparatus of the present preferred embodiment has improved diversity and MIMO transmission and reception characteristics.

Into the signal level detector circuit 7, received signals after A/D conversion (i.e., digital signals) are inputted. Signal levels of the received signals are decided by digital processing. In this case, it is possible to perform processes including detection and decision of signal levels in an entirely digital manner, and accordingly, the processes can be implemented by using semiconductor integrated circuits such as ICs or LSIs, thus achieving reduction in size and weight of a wireless apparatus.

Preferably, the MIMO antenna apparatus of the present preferred embodiment is provided with, if necessary, a radio frequency filter for separating signals of a predetermined frequency from radio signals received by the antennas 1a, 1b, 2a, and 2b; and a radio frequency amplifier for amplifying the signals, in a previous stage of the A/D converter circuit 5. Further, preferably, the MIMO antenna apparatus of the present preferred embodiment is provided with, if necessary, a radio frequency circuit such as a mixer for converting frequency of respective received signals outputted from the A/D converter circuit 5, an intermediate frequency circuit, and a signal processing circuit, and the like, in a previous stage of the MIMO demodulator circuit 6. The components listed above are not described in the specification and in the drawings for ease of explanation.

The MIMO antenna apparatus and a sender-side radio station apparatus can perform MIMO communication using any one of a plurality of modulation and demodulation methods with different transmission rates, according to an implementation example. For example, communication can be performed using any one of BPSK, QPSK, 16QAM, and 64QAM, which are listed in ascending order of transmission rate.

Although in this specification an exemplary case is described in which four antennas 1a, 1b, 2a, and 2b are provided and two of the antennas are connected to the A/D converter circuit 5, it is also possible to use a configuration in which three or five or more antennas are provided, or a configuration in which three or more antennas are connected to the A/D converter circuit 5. Moreover, although an exemplary case of receiving operation is described, the same effects can be expected upon transmission by having the same configuration. The positions of the slits 11a and 11b are not limited to those shown in FIG. 2, and the slits 11a and 11b may be provided at any positions as long as at least one of the slits is located between at least two of antennas operable as planar antennas, like the antennas 1a and 1b.

In typical operation of the MIMO antenna apparatus of the present preferred embodiment, the controller 8 initially connects the antennas 1a and 1b to the wireless communication circuit 10. This is because the antennas 1a and 1b are the farthest apart from each other, and thus the lowest correlation coefficient between received signals of the antennas can be expected. In addition, since most base station antennas for mobile phones radiate radio waves with vertical polarization, the antennas 1a and 1b, which are electric current antennas capable of transmission and reception with vertical polarization, are more likely to have higher received power. MIMO antenna apparatuses preferably have low correlation coefficients between antennas, and high received powers of the antennas, for the purpose of high-speed wireless transmission. The low correlation coefficient can demultiplex spatially-multiplexed signals. In addition, the high received power can reduce the error rate, and thus use higher-speed multi-level modulation. Similarly, also in diversity antennas, a decreased correlation coefficient can prevent instantaneous degradations in received power due to fading, and an increased received power can reduce the error rate. Moreover, there is an advantage that when not operating the antennas 2a and 2b, the slits 11a and 11b provide high isolation between the antennas 1a and 1b. For these reasons, typically, the antennas 1a and 1b are connected to the wireless communication circuit 10. However, since the antennas 1a and 1b are provided at both side edges in the portable wireless communication apparatus of FIG. 2, the antennas 1a and 1b are likely to be affected by fingers when holding the portable wireless communication apparatus. When the antennas 1a and 1b are covered by fingers, received power may decrease. Hence, when detecting a decrease in received power, the antennas 1a and/or 1b are changed to the antennas 2a and/or 2b provided more interior to the portable wireless communication apparatus, thus maintaining high-quality and high-speed communication.

FIGS. 5 to 8 are flowcharts showing a MIMO adaptive control process performed by the controller 8 of FIG. 1. In step S1 of FIG. 5, the controller 8 controls the switching circuit 4 to connect the antennas 1a and 1b to the A/D converter circuit 5. At this time, the controller 8 obtains signal levels of received signals by the antennas 1a and 1b from the signal level detector circuit 7, and stores the obtained signal levels in the signal information memory 3. Then, in step S2, the controller 8 determines whether or not the signal level of the antenna 1a is higher than a predetermined threshold value. If YES, then the controller 8 proceeds to step S3; and if NO, then the controller 8 proceeds to step S11 of FIG. 6. In step S3, the controller 8 determines whether or not the signal level of the antenna 1b is higher than the threshold value. If YES, then the controller 8 proceeds to step S9; and if NO, then the controller 8 proceeds to step S4. In step S11, the controller 8 determines whether or not the signal level of the antenna 1b is higher than the threshold value. If YES, then the controller 8 proceeds to step S12; and if NO, then the controller 8 proceeds to step S17 of FIG. 7.

When the signal levels of both the antennas 1a and 1b are higher than the threshold value (i.e., when YES in both steps S2 and S3), then in step S9, the controller 8 allows the MIMO demodulator circuit 6 to continue a demodulation process. Then, in step S10, the controller 8 determines whether or not the number of demodulation processes has exceeded a predetermined number of demodulations. If YES, then the controller 8 returns to step S1; and if NO, then the controller 8 repeats step S9.

When the signal level of the antenna 1a is higher than the threshold value, and the signal level of the antenna 1b is lower than or equal to the threshold value (i.e., when YES in step S2 and NO in step S3), then in step S4, the controller 8 controls the switch 4b of the switching circuit 4 to connect the antenna 2b as a slit antenna to the A/D converter circuit 5, instead of the antenna 1b as a planar antenna. At this time, the controller 8 obtains a signal level of a received signal by the antenna 2b from the signal level detector circuit 7, and stores the obtained signal level in the signal information memory 3. Then, in step S5, the controller 8 determines whether or not the signal level of the antenna 2b is higher than the signal level of the antenna 1b. If YES, then the controller 8 proceeds to step S7; and if NO, then the controller 8 proceeds to step S6. In step S6, the controller 8 controls the switch 4b of the switching circuit 4 to connect the antenna 1b to the A/D converter circuit 5, instead of the antenna 2b, and proceeds to step S7. At this time, the controller 8 obtains a signal level of a received signal by the antenna 1b from the signal level detector circuit 7, and overwrites a corresponding signal level in the signal information memory 3 with the obtained signal level. In step S7, the controller 8 allows the MIMO demodulator circuit 6 to continue a demodulation process. Then, in step S8, the controller 8 determines whether or not the number of demodulation processes has exceeded the predetermined number of demodulations. If YES, then the controller 8 returns to step S1; and if NO, then the controller 8 returns to step S5.

Figure 6:
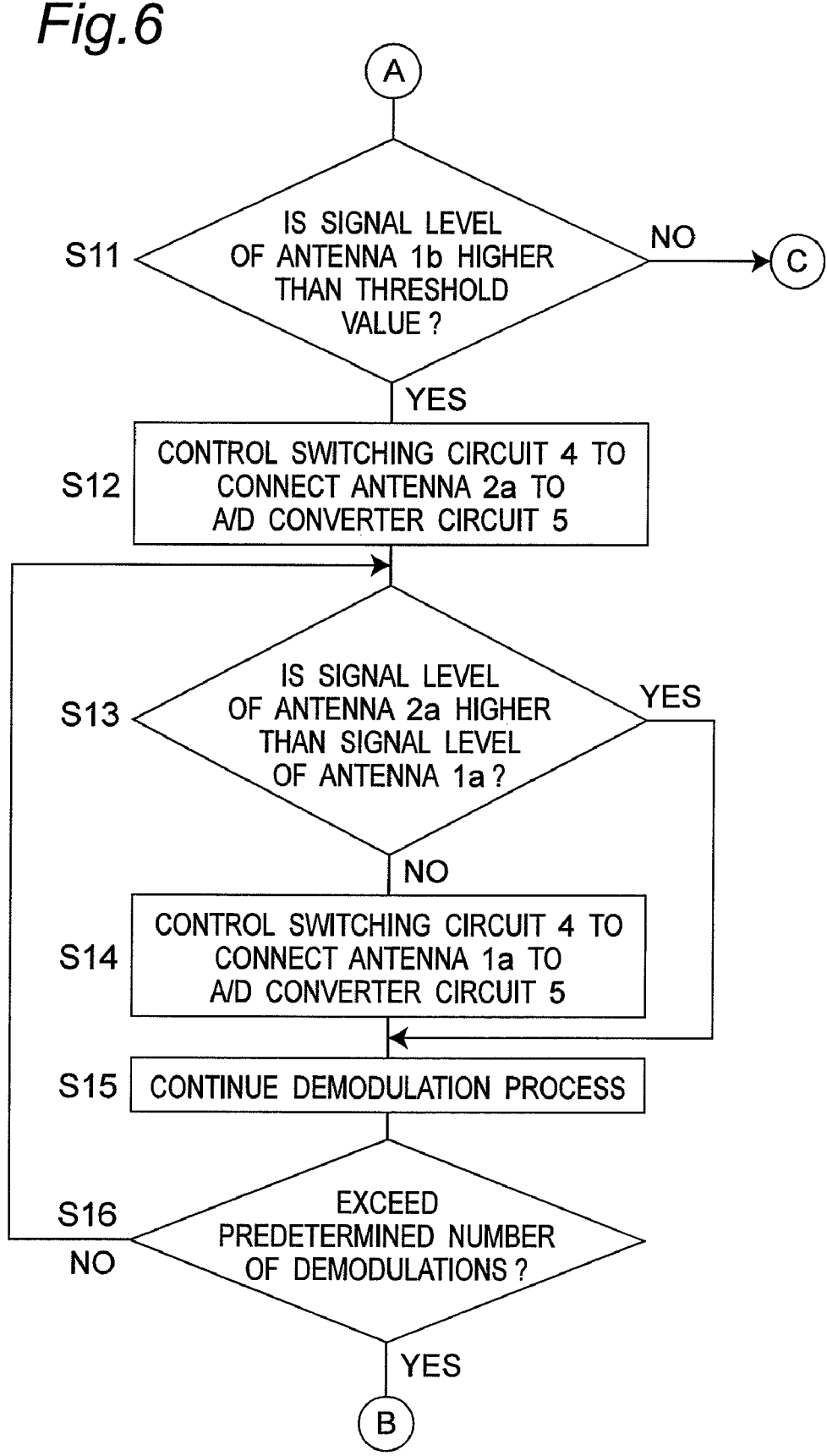
FIG. 6 is a flowchart showing a second part of the MIMO adaptive control process performed by the controller 8 of FIG. 1.

When the signal level of the antenna 1a is lower than or equal to the threshold value, and the signal level of the antenna 1b is higher than the threshold value (i.e., when NO in step S2 and YES in step S11), then in step S12 of FIG. 6, the controller 8 controls the switch 4a of the switching circuit 4 to connect the antenna 2a as a slit antenna to the A/D converter circuit 5, instead of the antenna 1a as a planar antenna. At this time, the controller 8 obtains a signal level of a received signal by the antenna 2a from the signal level detector circuit 7, and stores the obtained signal level in the signal information memory 3. Then, in step S13, the controller 8 determines whether or not the signal level of the antenna 2a is higher than the signal level of the antenna 1a. If YES, then the controller 8 proceeds to step S15; and if NO, then the controller 8 proceeds to step S14. In step S14, the controller 8 controls the switch 4a of the switching circuit 4 to connect the antenna 1a to the A/D converter circuit 5, instead of the antenna 2a, and proceeds to step S15. At this time, the controller 8 obtains a signal level of a received signal by the antenna 1a from the signal level detector circuit 7, and overwrites a corresponding signal level in the signal information memory 3 with the obtained signal level. In step S15, the controller 8 allows the MIMO demodulator circuit 6 to continue a demodulation process. Then, in step S16, the controller 8 determines whether or not the number of demodulation processes has exceeded the predetermined number of demodulations. If YES, then the controller 8 returns to step S1 of FIG. 5; and if NO, then the controller 8 returns to step S13.

Figure 7:
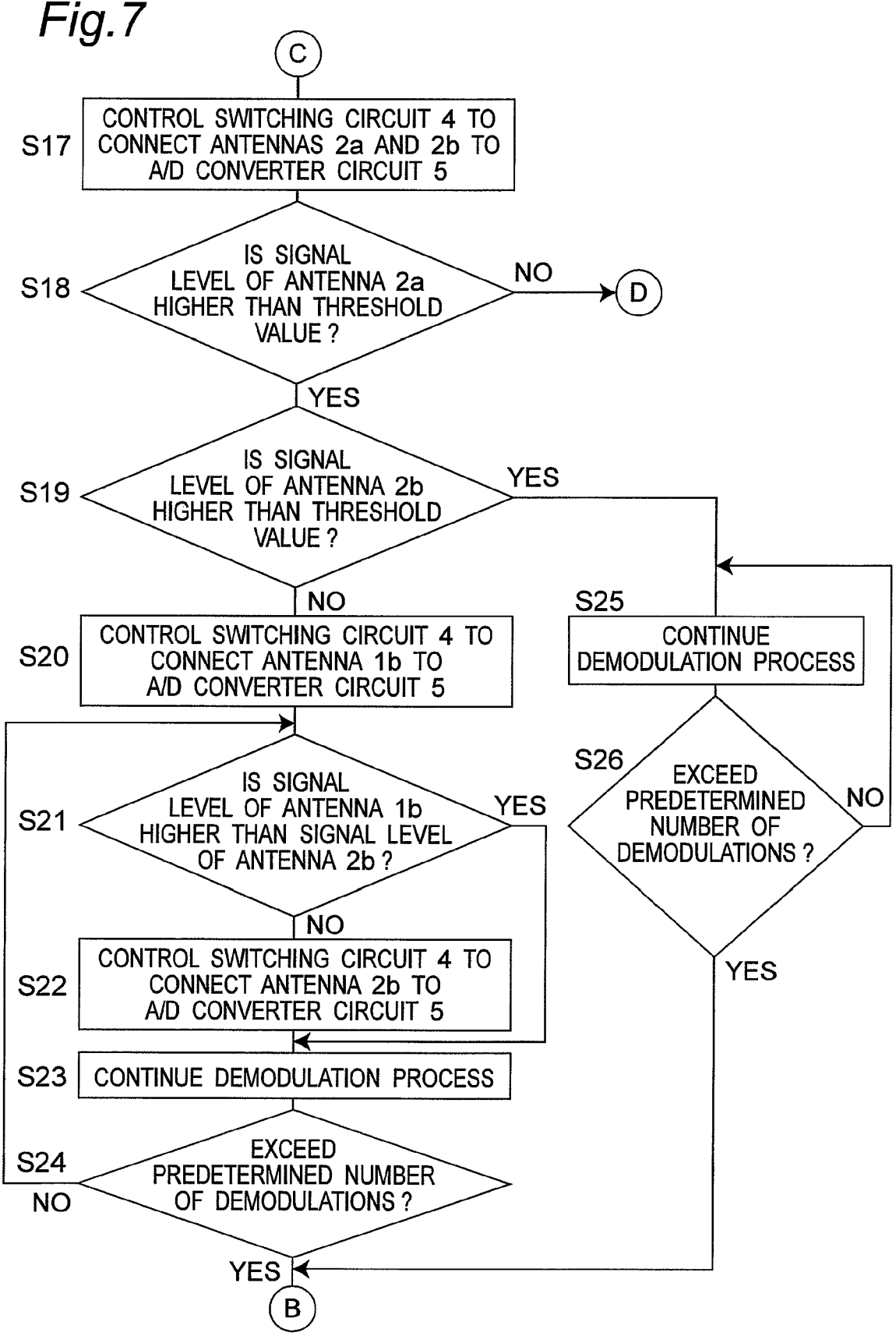
FIG. 7 is a flowchart showing a third part of the MIMO adaptive control process performed by the controller 8 of FIG. 1.

When the signal levels of both the antennas 1*a* and 1*b* are lower than or equal to the threshold value (i.e., when NO in both steps S2 and S11), then in step S17 of FIG. 7, the controller 8 controls the switching circuit 4 to connect the antennas 2*a* and 2*b* as slit antennas to the A/D converter circuit 5, instead of the antennas 1*a* and 1*b* as planar antennas. At this time, the controller 8 obtains signal level is of received signals by the antennas 2*a* and 2*b* from the signal level detector circuit 7, and stores the obtained signal levels in the signal information memory 3. In step S18, the controller 8 determines whether or not the signal level of the antenna 2*a* is higher than the threshold value. If YES, then the controller 8 proceeds to step S19; and if NO, then the controller 8 proceeds to step S27 of FIG. 8. In step S19, the controller 8 determines whether or not the signal level of the antenna 2*b* is higher than the threshold value. If YES, then the controller 8 proceeds to step S25; and if NO, then the controller 8 proceeds to step S20. In step S27, the controller 8 determines whether or not the signal level of the antenna 2*b* is higher than the threshold value. If YES, then the controller 8 proceeds to step S28; and if NO, then the controller 8 proceeds to step S33.

When the signal levels of both the antennas 2*a* and 2*b* are higher than the threshold value (i.e., when YES in both steps S18 and S19), then in step S25 of FIG. 7, the controller 8 allows the MIMO demodulator circuit 6 to continue a demodulation process. Then, in step S26, the controller 8 determines whether or not the number of demodulation processes has exceeded the predetermined number of demodulations. If YES, then the controller 8 returns to step S1 of FIG. 5; and if NO, then the controller 8 repeats step S25.

When the signal level of the antenna 2*a* is higher than the threshold value, and the signal level of the antenna 2*b* is lower than or equal to the threshold value (i.e., when YES in step S18 and NO in step S19), then in step S20 of FIG. 7, the controller 8 controls the switch 4*b* of the switching circuit 4 to connect the antenna 1*b* as a planar antenna to the A/D converter circuit 5, instead of the antenna 2*b* as a slit antenna. At this time, the controller 8 obtains a signal level of a received signal by the antenna 1*b* from the signal level detector circuit 7, and overwrites a corresponding signal level in the signal information memory 3 with the obtained signal level. In step S21, the controller 8 determines whether or not the signal level of the antenna 1*b* is higher than the signal level of the antenna 2*b*. If YES, then the controller 8 proceeds to step S23; and if NO, then the controller 8 proceeds to step S22. In step S22, the controller 8 controls the switch 4*b* of the switching circuit 4 to connect the antenna 2*b* to the A/D converter circuit 5, instead of the antenna 1*b*, and proceeds to step S23. At this time, the controller 8 obtains a signal level of a received signal by the antenna 2*b* from the signal level detector circuit 7, and overwrites a corresponding signal level in the signal information memory 3 with the obtained signal level. In step S23, the controller 8 allows the MIMO demodulator circuit 6 to continue a demodulation process. Then, in step S24, the controller 8 determines whether or not the number of demodulation processes has exceeded the predetermined number of demodulations. If YES, then the controller 8 returns to step S1 of FIG. 5; and if NO, then the controller 8 returns to step S21.

Figure 8:
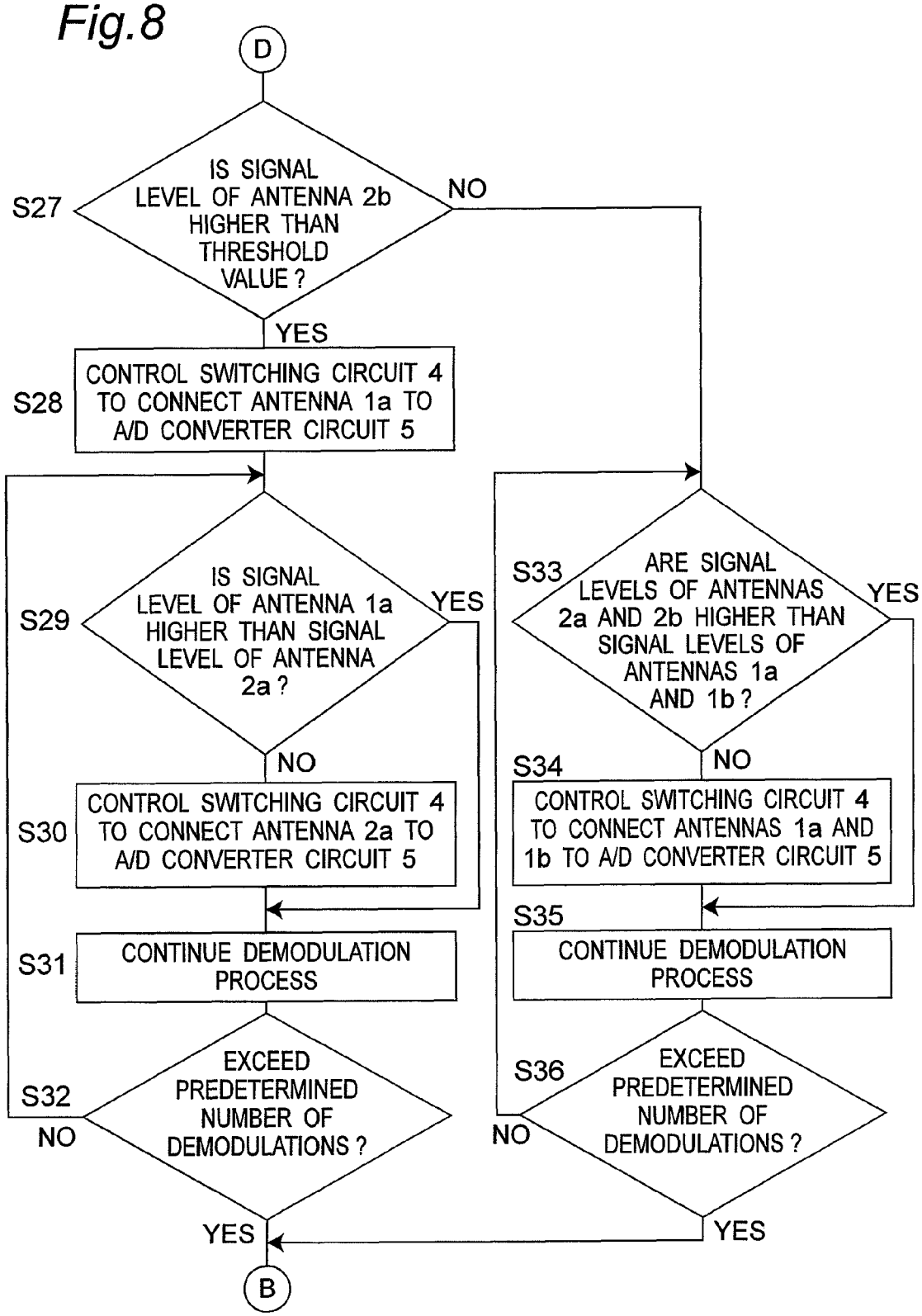
FIG. 8 is a flowchart showing a fourth part of the MIMO adaptive control process performed by the controller 8 of FIG. 1.

When the signal level of the antenna 2*a* is lower than or equal to the threshold value, and the signal level of the antenna 2*b* is higher than the threshold value (i.e., when NO in step S18 and YES in step S27), then in step S28 of FIG. 8, the controller 8 controls the switch 4*a* of the switching circuit 4 to connect the antenna 1*a* as a planar antenna to the A/D converter circuit 5, instead of the antenna 2*a* as a slit antenna. At this time, the controller 8 obtains a signal level of a received signal by the antenna 1*a* from the signal level detector circuit 7, and overwrites a corresponding signal level in the signal information memory 3 with the obtained signal level. In step S29, the controller 8 determines whether or not the signal level of the antenna 1*a* is higher than the signal level of the antenna 2*a*. If YES, then the controller 8 proceeds to step S31; and if NO, then the controller 8 proceeds to step S30. In step S30, the controller 8 controls the switching circuit 4 to connect the antenna 2*a* to the A/D converter circuit 5, and proceeds to step S31. At this time, the controller 8 obtains a signal level of a received signal by the antenna 2*a* from the signal level detector circuit 7, and overwrites a corresponding signal level in the signal information memory 3 with the obtained signal level. In step S31, the controller 8 allows the MIMO demodulator circuit 6 to continue a demodulation process. Then, in step S32, the controller 8 determines whether or not the number of demodulation processes has exceeded the predetermined number of demodulations. If YES, then the controller 8 returns to step S1 of FIG. 5; and if NO, then the controller 8 returns to step S29.

When the signal levels of both the antennas 2*a* and 2*b* are lower than or equal to the threshold value (i.e., when NO in both steps S18 and S27), then in step S33 of FIG. 8, the controller 8 determines whether or not the signal levels of the antennas 2*a* and 2*b* as slit antennas are higher than the signal levels of the antennas 1*a* and 1*b* as planar antennas. If YES, then the controller 8 proceeds to step S35; and if NO, then the controller 8 proceeds to step S34. In this case, the comparison of signal levels is made by, e.g., comparing the sum of the signal levels of the antennas 2*a* and 2*b* with the sum of the signal levels of the antennas 1*a* and 1*b*, or comparing averages of the respective signal levels, or comparing higher ones of the respective signal levels, or comparing lower ones of the respective signal levels, but the comparison methods are not limited thereto. In step S34, the controller 8 controls the switching circuit 4 to connect the antennas 1*a* and 1*b* to the A/D converter circuit 5, instead of the antennas 2*a* and 2*b*, and proceeds to step S35. At this time, the controller 8 obtains signal levels of received signals by the antennas 1*a* and 1*b* from the signal level detector circuit 7, and overwrites corresponding signal levels in the signal information memory 3 with the obtained signal levels. In step S35, the controller 8 allows the MIMO demodulator circuit 6 to continue a demodulation process. Then, in step S36, the controller 8 determines whether or not the number of demodulation processes has exceeded the predetermined number of demodulations. If YES, then the controller 8 returns to step S1 of FIG. 5; and if NO, then the controller 8 returns to step S33.

Now, the specific examples of the threshold values for signal levels of received signals will be described. For example, when using CNR for the threshold value, the CNR threshold value is set to a value corresponding to $BER=10^{-6}$ which is set as a threshold value for an instantaneous BER (i.e., a BER measured in a very short time interval), for each modulation and demodulation method. Specifically, in the case of BPSK the CNR is set to 11 dB, in the case of QPSK the CNR is set to 14 dB, in the case of 16QAM the CNR is set to 21 dB, and in the case of 64QAM the CNR is set to 27 dB. When using time-averaged CNR for evaluation, the CNR threshold value is set to a value corresponding to $BER=10^{-2}$ which is set as a threshold value for a time-averaged BER according to the relationship of BER, for each modulation and demodulation method.

Specifically, in the case of BPSK the CNR is set to 14 dB, in the case of QPSK the CNR is set to 17 dB, in the case of 16QAM the CNR is set to 23 dB, and in the case of 64QAM the CNR is set to 28 dB. The threshold value for signal levels is not limited to the above exemplary values, and can be set to a value corresponding to a signal level (e.g., power) at which no errors occurs in each modulation and demodulation method being used.

The number of demodulations in steps S8, S10, S16, S24, S26, S32, and S36 is determined as a number of cycles, in each of which radio wave conditions are monitored. Alternatively, instead of comparing the number of demodulation processes with a predetermined threshold value, it is possible to determine whether or not a demodulation process by the MIMO demodulator circuit 6 has continued for a predetermined period of time and then timed out.

Thus, according to the MIMO adaptive control process of the present preferred embodiment, it is possible to achieve the diversity reception by comparing signal levels of the respective antennas 1a and 2a and connecting an antenna with a higher signal level to the A/D converter circuit 5, and achieve the diversity reception by comparing signal levels of the respective antennas 1b and 2b and connecting an antenna with a higher signal level to the A/D converter circuit 5. In this case, when a signal level of an antenna connected to the A/D converter circuit 5 by one of the switches 4a and 4b is lower than or equal to the threshold value (when NO in step S3, YES in step S11, NO in step S19, or YES in step S27), the controller 8 controls the switch to change a feed point connected to the MIMO demodulator circuit 6, to the other feed point. When the signal level after the change has not improved over the signal level before the change (when NO in step S5, S13, S21, or S29), the controller 8 controls the switch to re-connect the antenna previously connected to the A/D converter circuit 5.

According to the MIMO antenna apparatus of the present preferred embodiment with the configuration described above, it is possible to provide a MIMO antenna apparatus capable of achieving stable MIMO wireless communication by using diversity antennas each configured such that the controller 8 switches between a slit antenna and a planar antenna based on a signal level of a received signal, and capable of achieving high isolation by using slits which are not fed. Further, it is possible to provide a MIMO antenna apparatus suitable for mobile terminals requiring small size, by providing a plurality of feed points on a single upper housing 11 made of metal and operating the upper housing 11 through the feed points as antennas 1a, 1b, 2a, and 2b, respectively, as shown in FIG. 2.

Figure 9:
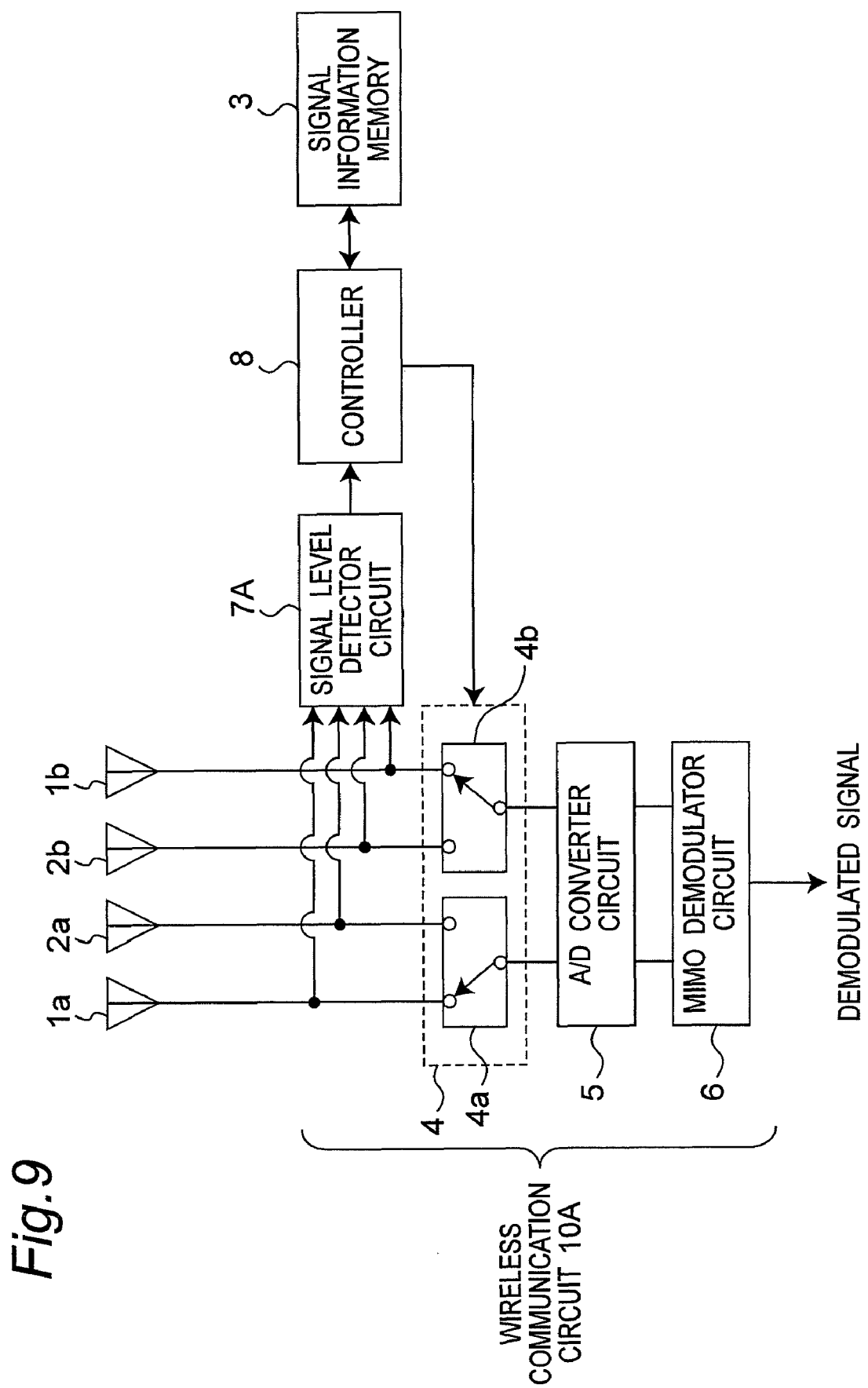
FIG. 9 is a block diagram showing a configuration of a MIMO antenna apparatus according to a first modified preferred embodiment of the first preferred embodiment of the present invention.

FIG. 9 is a block diagram showing a configuration of a MIMO antenna apparatus according to a first modified preferred embodiment of the first preferred embodiment of the present invention. The MIMO antenna apparatus of the present modified preferred embodiment is characterized by a signal level detector circuit 7A connected to each of antennas 1a, 1b, 2a, and 2b, instead of a signal level detector circuit 7 of FIG. 1. With this configuration, it is possible to directly detect signal levels of received signals arriving at the antennas 1a, 1b, 2a, and 2b, instead of detecting signal levels of only two received signals selected by a switching circuit 4 as in FIG. 1.

Figure 10:
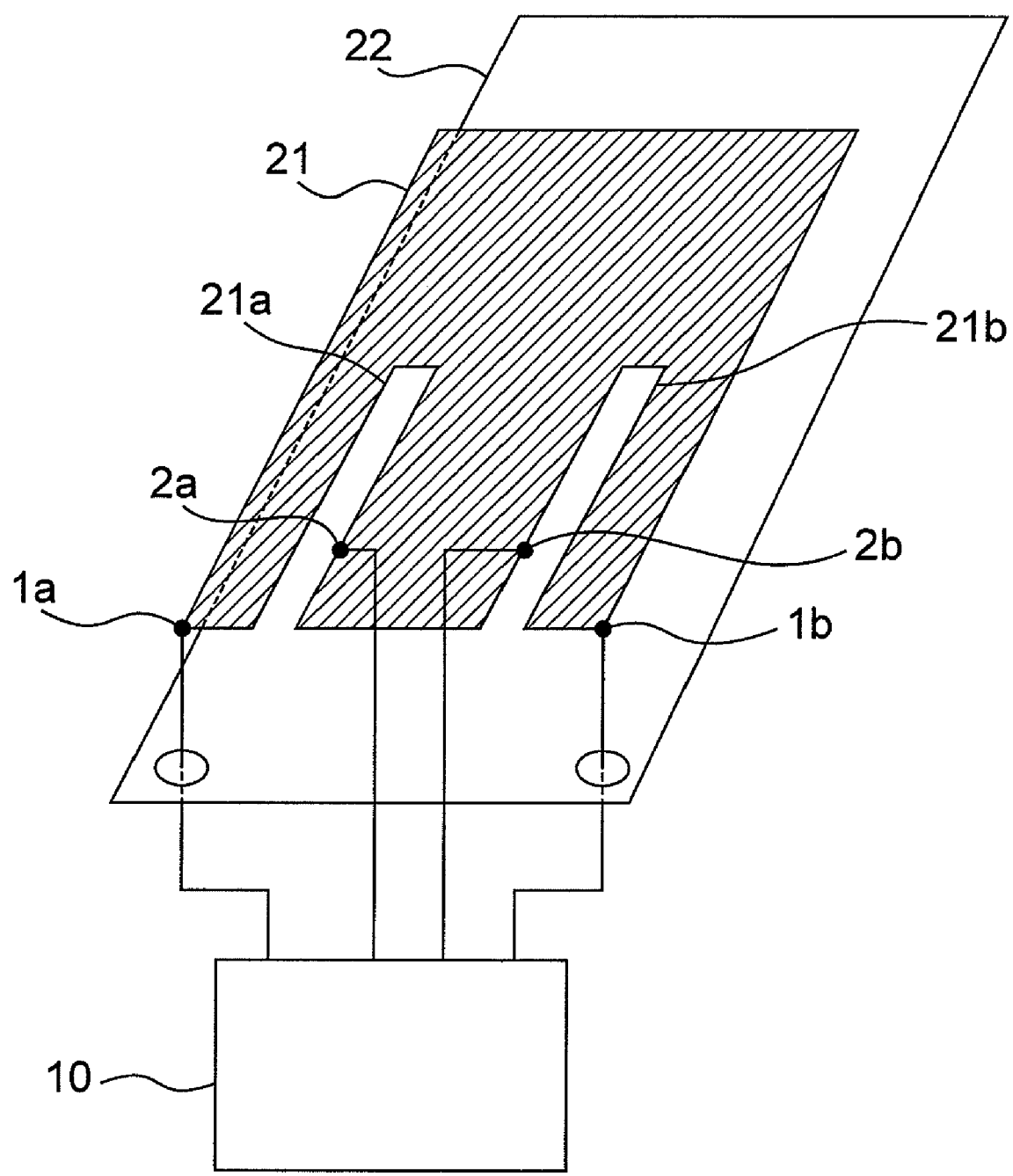
FIG. 10 is a perspective view showing a configuration of a MIMO antenna apparatus according to a second modified preferred embodiment of the first preferred embodiment of the present invention.
Figure 11:
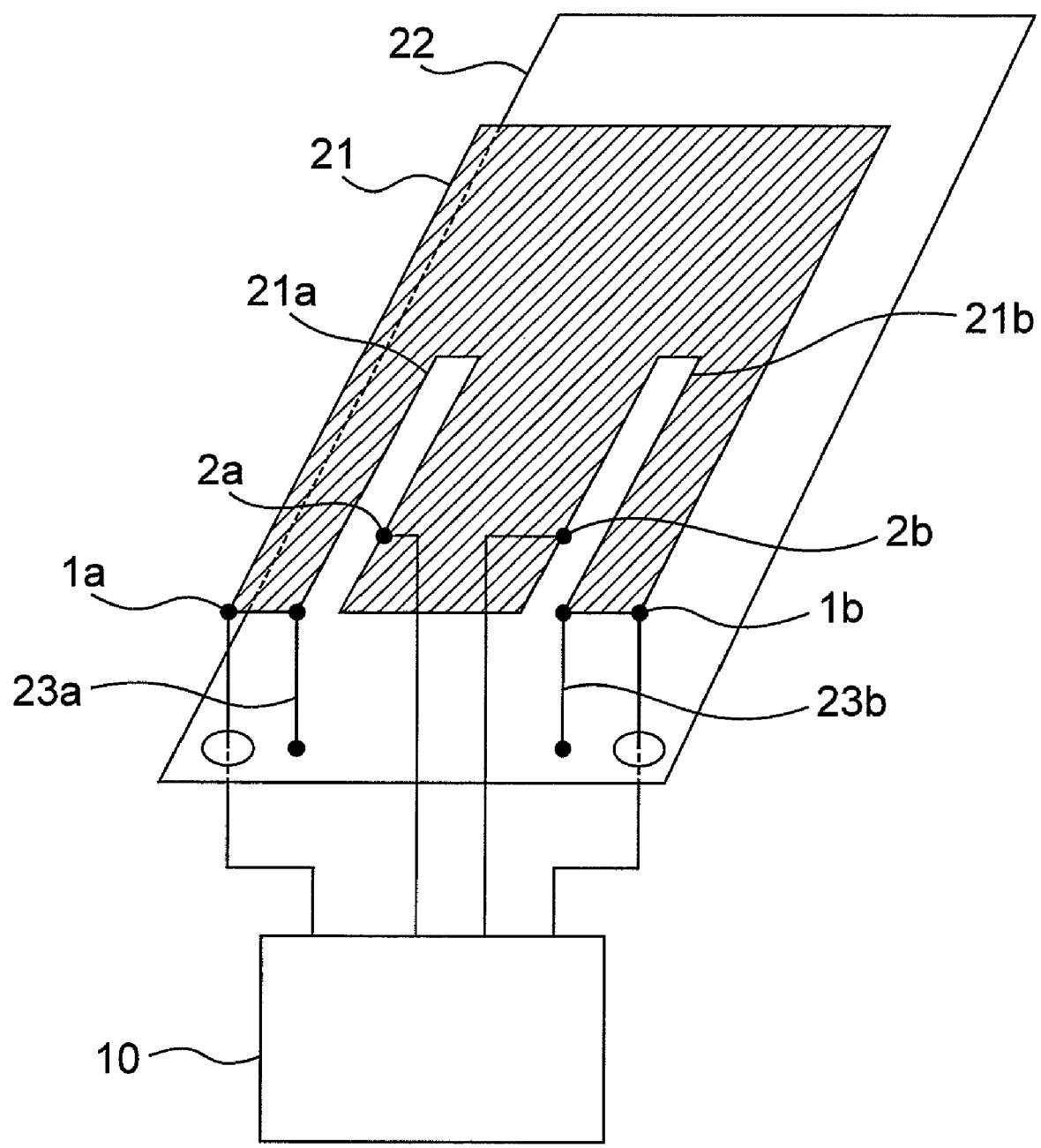
FIG. 11 is a perspective view showing a configuration of a MIMO antenna apparatus according to a third modified preferred embodiment of the first preferred embodiment of the present invention.

FIG. 10 is a perspective view showing a configuration of a MIMO antenna apparatus according to a second modified preferred embodiment of the first preferred embodiment of the present invention. FIG. 11 is a perspective view showing a configuration of a MIMO antenna apparatus according to a third modified preferred embodiment of the first preferred embodiment of the present invention. Although the implementation example of FIG. 2 shows a foldable mobile phone as an example, the preferred embodiment is not limited thereto. The MIMO antenna apparatus of FIG. 10 is configured as a planar inverted-L antenna including a planar radiating conductor plate 21 and a planar ground conductor plate 22, which are provided in parallel to each other with a certain distance therebetween. The radiating conductor plate 21 is provided with slits 21a and 21b, and feed points associated with antennas 1a, 1b, 2a, and 2b. The MIMO antenna apparatus of FIG. 11 is configured as a planar inverted-F antenna having the configuration of FIG. 10, and further having connecting conductors 23a and 23b short-circuiting a radiating conductor plate 21 and a ground conductor plate 22. These configurations have an advantage that a radiating conductor plate 21 of any shape can be used for configuring a portable wireless communication apparatus provided with a MIMO antenna apparatus, without restrictions imposed by a housing shape of the portable wireless communication apparatus. In addition, the preferred embodiment of the present invention is not limited to a housing antenna, an inverted-L antenna, and an inverted-F antenna, and may be configured as different planar antennas or other antennas.

As described above, according to the MIMO antenna apparatus of the present preferred embodiment, the slits 11a and 11b are used to achieve high isolation between antennas and simultaneously to operate as slit antennas, thus configuring multiple diversity antennas while maintaining high isolation. Accordingly, it is possible to provide a MIMO antenna apparatus capable of stable, high-quality and high-speed communication, and provide a mobile wireless communication apparatus provided with the MIMO antenna apparatus.

Second Preferred Embodiment

Figure 12:
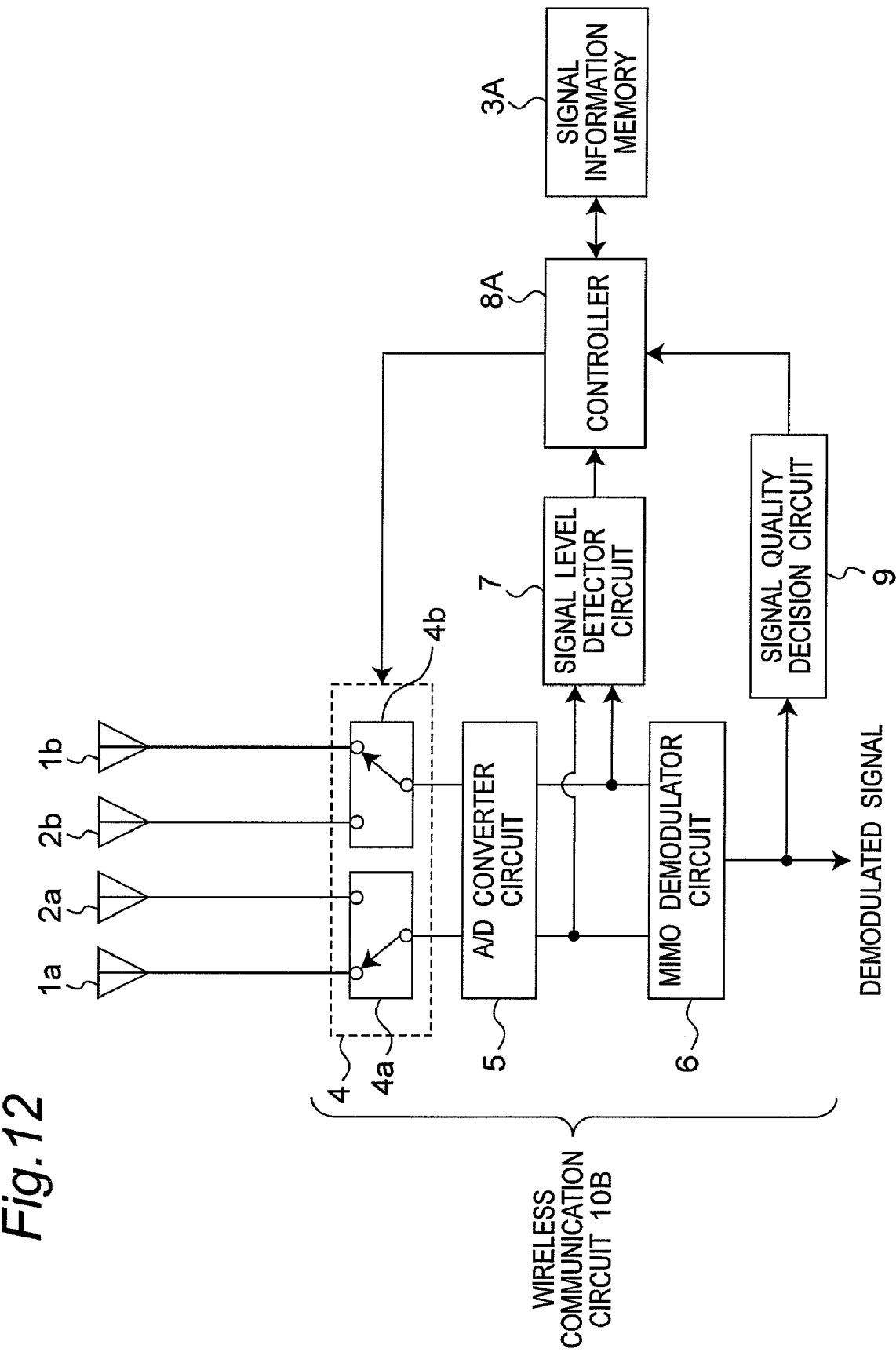
FIG. 12 is a block diagram showing a configuration of a MIMO antenna apparatus according to a second preferred embodiment of the present invention.
Figure 13:
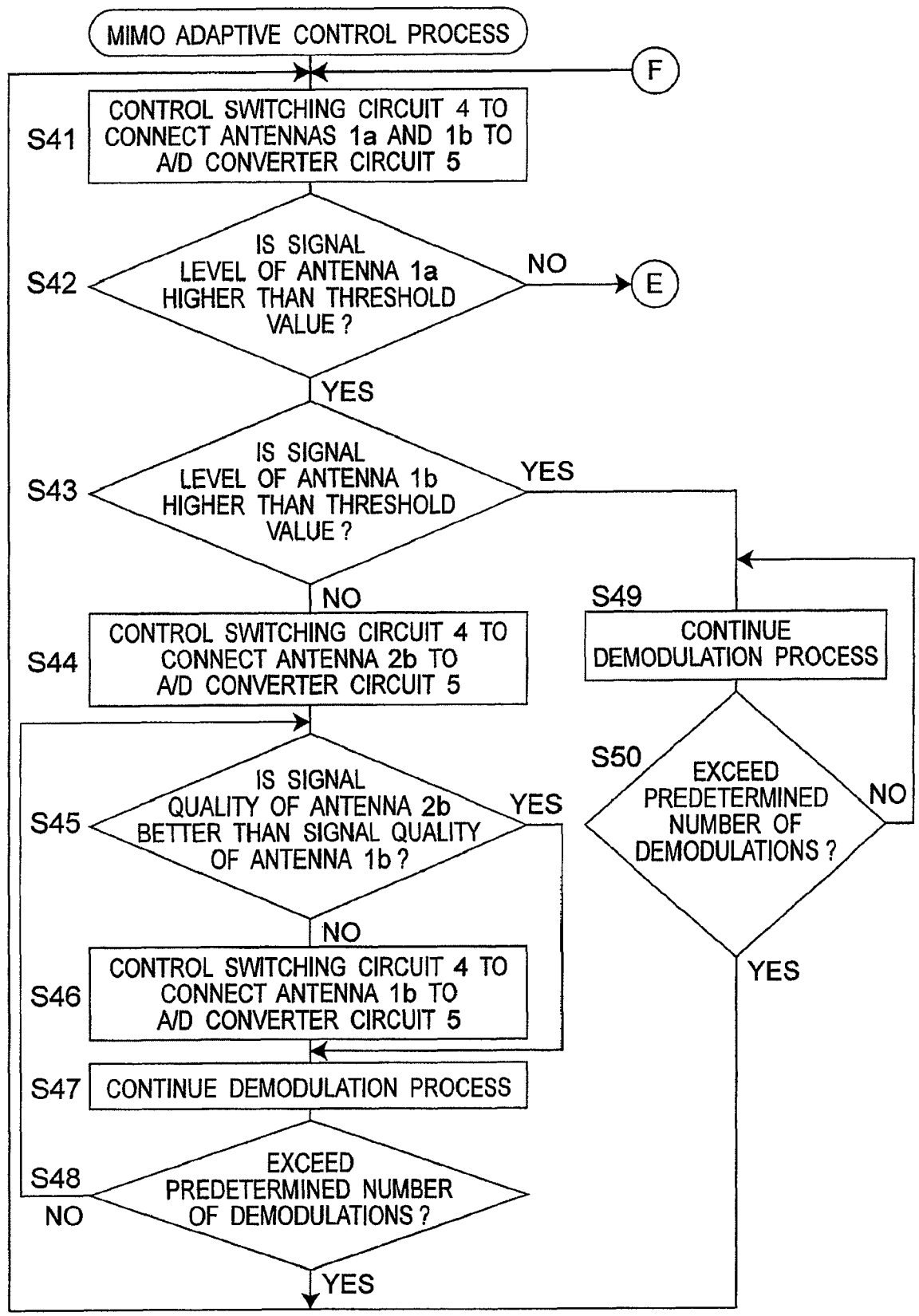
FIG. 13 is a flowchart showing a first part of a MIMO adaptive control process performed by a controller 8A of FIG. 12.

FIG. 12 is a block diagram showing a configuration of a MIMO antenna apparatus according to a second preferred embodiment of the present invention. The MIMO antenna apparatus of the present preferred embodiment is characterized by having the configuration of FIG. 1, and further having a signal quality decision circuit 9 for deciding signal quality of a demodulated signal outputted from a MIMO demodulator circuit 6. The signal quality decision circuit 9 decides a bit error rate (BER) of a demodulated signal as a reference indicative of the signal quality of the demodulated signal. The signal quality decision circuit 9 may obtain an instantaneous BER, or alternatively obtain a BER averaged over a certain period of time in consideration of a multipath environment with Rayleigh fading. As the signal quality, a packet error rate or a throughput (e.g., represented by a rate of received data) may be used instead of a bit error rate (BER). A controller 8A performs a MIMO adaptive control process to control a switching circuit 4, as described later with reference to FIGS. 13 to 16, based on signal levels of respective antennas 1a, 1b, 2a, and 2b detected by a signal level detector circuit 7 and based on signal quality decided by the signal quality decision circuit 9, thus achieving the diversity reception with changing the antennas 1a, 1b, 2a, and 2b from one another so as to improve the signal quality of a demodulated signal. A signal information memory 3A is used by the controller 8A not only to store signal levels of the respective antennas, in a manner similar to that of a signal information memory 3 of FIG. 1, but also to store signal quality of a demodulated signal used during a MIMO adaptive control process.

FIGS. 13 to 16 are flowcharts showing a MIMO adaptive control process performed by the controller 8A of FIG. 12. In step S41 of FIG. 13, the controller 8A controls the switching circuit 4 to connect the antennas 1a and 1b to an A/D converter circuit 5. At this time, the controller 8A obtains signal levels of received signals by the antennas 1a and 1b from the signal level detector circuit 7, obtains signal quality of a demodulated signal from the signal quality decision circuit 9, and stores the obtained signal levels and signal quality in the signal information memory 3A. Then, in step S42, the controller 8A determines whether or not the signal level of the antenna 1a is higher than a predetermined threshold value. If YES, then the controller 8A proceeds to step S43; and if NO, then the controller 8A proceeds to step S51 of FIG. 14. In this case, when the signal quality decision circuit 9 obtains an instantaneous BER, the threshold value for signal levels is set to a required reception level corresponding to, e.g., $10^{-6}$. On the other hand, when the signal quality decision circuit 9 obtains a BER averaged over a certain period of time in consideration of a multipath environment with Rayleigh fading, the threshold value is set to a required reception level corresponding to, e.g., $10^{-2}$. In step S43, the controller 8A determines whether or not the signal level of the antenna 1b is higher than the threshold value. If YES, then the controller 8A proceeds to step S49; and if NO, then the controller 8A proceeds to step S44. In step S51, the controller 8A determines whether or not the signal level of the antenna 1b is higher than the threshold value. If YES, then the controller 8A proceeds to step S52; and if NO, then the controller 8A proceeds to step S57 of FIG. 15.

When the signal levels of both the antennas 1a and 1b are higher than the threshold value (i.e., when YES in both steps S42 and S43), then in step S49, the controller 8A allows the MIMO demodulator circuit 6 to continue a demodulation process. Then, in step S50, the controller 8A determines whether or not the number of demodulation processes has exceeded a predetermined number of demodulations. If YES, then the controller 8A returns to step S41; and if NO, then the controller 8A repeats step S49.

When the signal level of the antenna 1a is higher than the threshold value, and the signal level of the antenna 1b is lower than or equal to the threshold value (i.e., when YES in step S42 and NO in step S43), then in step S44, the controller 8A controls a switch 4b of the switching circuit 4 to connect the antenna 2b as a slit antenna to the A/D converter circuit 5, instead of the antenna 1b as a planar antenna. At this time, the controller 8A obtains signal quality of a demodulated signal from the signal quality decision circuit 9, and stores the obtained signal quality in the signal information memory 3A. In step S45, the controller 8A determines whether or not the signal quality of the antenna 2b is better than the signal quality of the antenna 1b. If YES, then the controller 8A proceeds to step S47; and if NO, then the controller 8A proceeds to step S46. In step S46, the controller 8A controls the switch 4b of the switching circuit 4 to connect the antenna 1b to the A/D converter circuit 5, instead of the antenna 2b, and proceeds to step S47. At this time, the controller 8A obtains signal quality of a demodulated signal from the signal quality decision circuit 9, and overwrites the existing signal quality in the signal information memory 3A with the obtained signal quality. In step S47, the controller 8A allows the MIMO demodulator circuit 6 to continue a demodulation process. Then, in step S48, the controller 8A determines whether or not the number of demodulation processes has exceeded the predetermined number of demodulations. If YES, then the controller 8A returns to step S41; and if NO, then the controller 8A returns to step S45.

Figure 14:
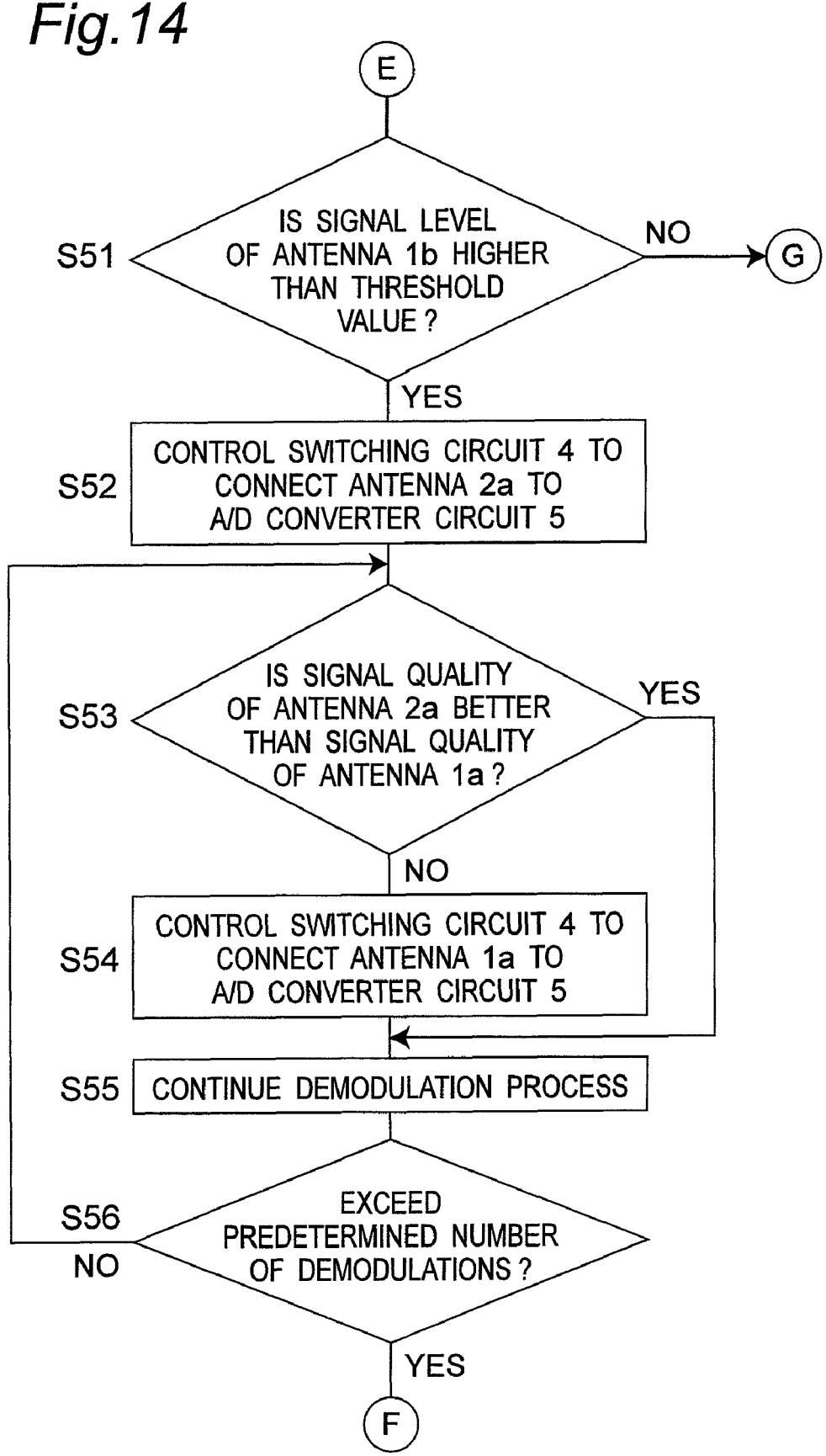
FIG. 14 is a flowchart showing a second part of the MIMO adaptive control process performed by the controller 8A of FIG. 12.

When the signal level of the antenna 1a is lower than or equal to the threshold value, and the signal level of the antenna 1b is higher than the threshold value (i.e., when NO in step S42 and YES in step S51), then in step S52 of FIG. 14, the controller 8A controls a switch 4a of the switching circuit 4 to connect the antenna 2a as a slit antenna to the A/D converter circuit 5, instead of the antenna 1a as a planar antenna. At this time, the controller 8A obtains signal quality of a demodulated signal from the signal quality decision circuit 9, and stores the obtained signal quality in the signal information memory 3A. In step S53, the controller 8A determines whether or not the signal quality of the antenna 2a is better than the signal quality of the antenna 1a. If YES, then the controller 8A proceeds to step S55; and if NO, then the controller 8A proceeds to step S54. In step S54, the controller 8A controls the switch 4a of the switching circuit 4 to connect the antenna 1a to the A/D converter circuit 5, instead of the antenna 2a, and proceeds to step S55. At this time, the controller 8A obtains signal quality of a demodulated signal from the signal quality decision circuit 9, and overwrites the existing signal quality in the signal information memory 3A with the obtained signal quality. In step S55, the controller 8A allows the MIMO demodulator circuit 6 to continue a demodulation process. Then, in step S56, the controller 8A determines whether or not the number of demodulation processes has exceeded the predetermined number of demodulations. If YES, then the controller 8A returns to step S41 of FIG. 13; and if NO, then the controller 8A returns to step S53.

Figure 15:
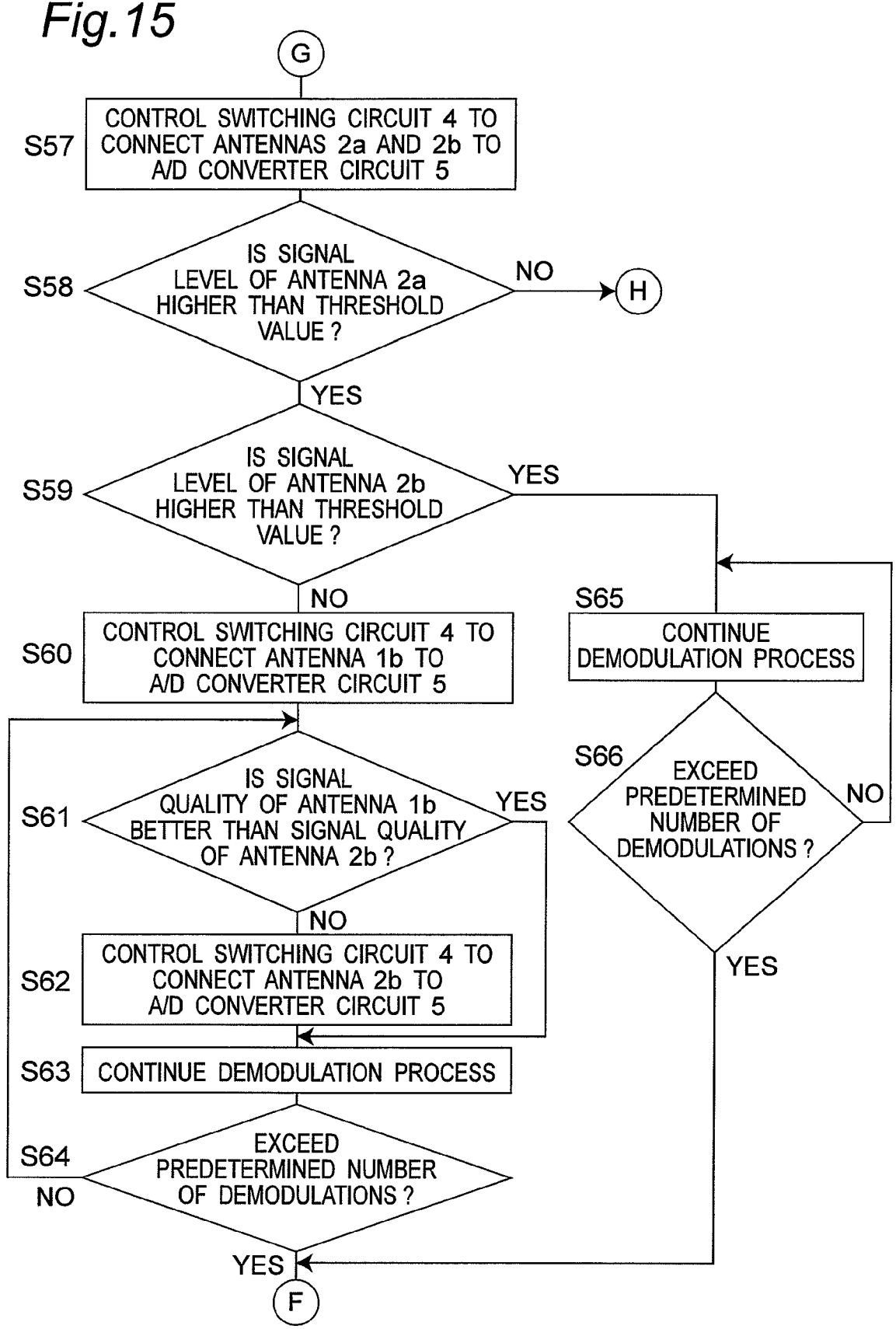
FIG. 15 is a flowchart showing a third part of the MIMO adaptive control process performed by the controller 8A of FIG. 12.

When the signal levels of both the antennas 1a and 1b are lower than or equal to the threshold value (i.e., when NO in both steps S42 and S51), then in step S57 of FIG. 15, the controller 8A controls the switching circuit 4 to connect the antennas 2a and 2b as slit antennas to the A/D converter circuit 5, instead of the antennas 1a and 1b as planar antennas. At this time, the controller 8A obtains signal levels of received signals by the antennas 2a and 2b from the signal level detector circuit 7, obtains signal quality of a demodulated signal from the signal quality decision circuit 9, and stores the obtained signal levels and signal quality in the signal information memory 3A. In step S58, the controller 8A determines whether or not the signal level of the antenna 2a is higher than the threshold value. If YES, then the controller 8A proceeds to step S59; and if NO, then the controller 8A proceeds to step S67 of FIG. 16. In step S59, the controller 8A determines whether or not the signal level of the antenna 2b is higher than the threshold value. If YES, then the controller 8A proceeds to step S65; and if NO, then the controller 8A proceeds to step S60. In step S67, the controller 8A determines whether or not the signal level of the antenna 2b is higher than the threshold value. If YES, then the controller 8A proceeds to step S68; and if NO, then the controller 8A proceeds to step S73.

When the signal levels of both the antennas 2a and 2b are higher than the threshold value (i.e., when YES in both steps S58 and S59), then in step S65 of FIG. 15, the controller 8A allows the MIMO demodulator circuit 6 to continue a demodulation process. Then, in step S66, the controller 8A determines whether or not the number of demodulation processes has exceeded the predetermined number of demodulations. If YES, then the controller 8A returns to step S41 of FIG. 13; and if NO, then the controller 8A repeats step S65.

When the signal level of the antenna 2a is higher than the threshold value, and the signal level of the antenna 2b is lower than or equal to the threshold value (i.e., when YES in step S58 and NO in step S59), then in step S60 of FIG. 15, the controller 8A controls the switch 4b of the switching circuit 4 to connect the antenna 1b as a planar antenna to the A/D converter circuit 5, instead of the antenna 2b as a slit antenna. At this time, the controller 8A obtains signal quality of a demodulated signal from the signal quality decision circuit 9, and overwrites the existing signal quality in the signal information memory 3A with the obtained signal quality. In step S61, the controller 8A determines whether or not the signal quality of the antenna 1b is better than the signal quality of the antenna 2b. If YES, then the controller 8A proceeds to step S63; and if NO, then the controller 8A proceeds to step S62. In step S62, the controller 8A controls the switch 4b of the switching circuit 4 to connect the antenna 2b to the A/D converter circuit 5, instead of the antenna 1b, and proceeds to step S63. At this time, the controller 8A obtains signal quality of a demodulated signal from the signal quality decision circuit 9, and overwrites the existing signal quality in the signal information memory 3A with the obtained signal quality. In step S63, the controller 8A allows the MIMO demodulator circuit 6 to continue a demodulation process. Then, in step S64, the controller 8A determines whether or not the number of demodulation processes has exceeded the predetermined number of demodulations. If YES, then the controller 8A returns to step S41 of FIG. 13; and if NO, then the controller 8A returns to step S61.

Figure 16:
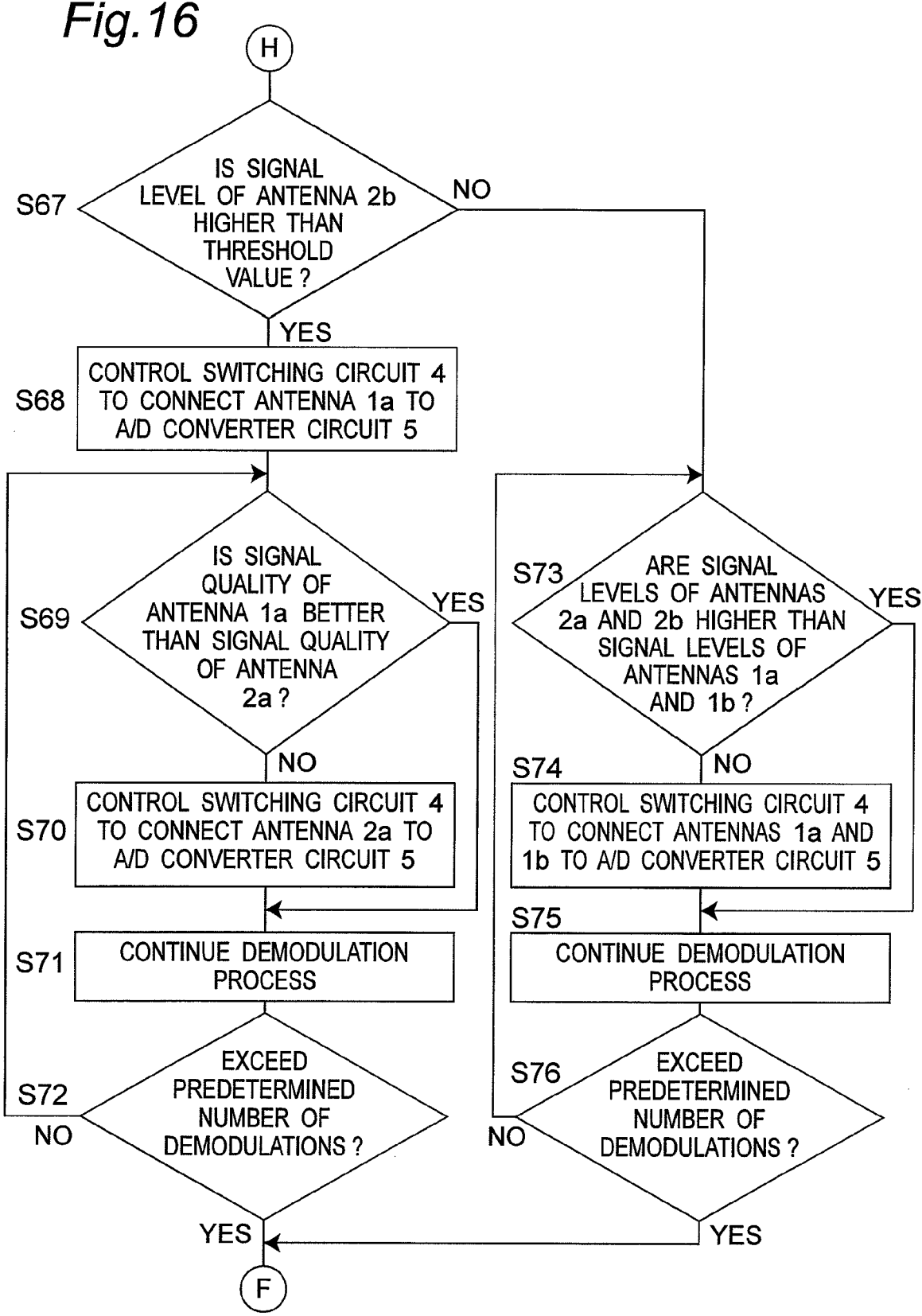
FIG. 16 is a flowchart showing a fourth part of the MIMO adaptive control process performed by the controller 8A of FIG. 12.

When the signal level of the antenna 2a is lower than or equal to the threshold value, and the signal level of the antenna 2b is higher than the threshold value (i.e., when NO in step S58 and YES in step S67), then in step S68 of FIG. 16, the controller 8A controls the switch 4a of the switching circuit 4 to connect the antenna 1a as a planar antenna to the A/D converter circuit 5, instead of the antenna 2a as a slit antenna. At this time, the controller 8A obtains signal quality of a demodulated signal from the signal quality decision circuit 9, and overwrites the existing signal quality in the signal information memory 3A with the obtained signal quality. In step S69, the controller 8A determines whether or not the signal quality of the antenna 1a is better than the signal quality of the antenna 2a. If YES, then the controller 8A proceeds to step S71; and if NO, then the controller 8A proceeds to step S70. In step S70, the controller 8A controls the switching circuit 4 to connect the antenna 2a to the A/D converter circuit 5, and proceeds to step S71. At this time, the controller 8A obtains signal quality of a demodulated signal from the signal quality decision circuit 9, and overwrites the existing signal quality in the signal information memory 3A with the obtained signal quality. In step S71, the controller 8A allows the MIMO demodulator circuit 6 to continue a demodulation process. Then, in step S72, the controller 8A determines whether or not the number of demodulation processes has exceeded the predetermined number of demodulations. If YES, then the controller 8A returns to step S41 of FIG. 13; and if NO, then the controller 8A returns to step S69.

When the signal levels of both the antennas 2a and 2b are lower than or equal to the threshold value (i.e., when NO in both steps S58 and S67), then in step S73 of FIG. 16, the controller 8A determines whether or not the signal levels of the antennas 2a and 2b as slit antennas are higher than the signal levels of the antennas 1a and 1b as planar antennas. If YES, then the controller 8A proceeds to step S75; and if NO, then the controller 8A proceeds to step S74. In this case, the comparison of signal levels is made by, e.g., comparing the sum of the signal levels of the antennas 2a and 2b with the sum of the signal levels of the antennas 1a and 1b, or comparing averages of the respective signal levels, or comparing higher ones of the respective signal levels, or comparing lower ones of the respective signal levels, but the comparison methods are not limited thereto. In step S74, the controller 8A controls the switching circuit 4 to connect the antennas 1a and 1b to the A/D converter circuit 5, instead of the antennas 2a and 2b, and proceeds to step S75. At this time, the controller 8A obtains signal levels of received signals by the antennas 1a and 1b from the signal level detector circuit 7, and overwrites corresponding signal levels in the signal information memory 3A with the obtained signal levels. In step S75, the controller 8A allows the MIMO demodulator circuit 6 to continue a demodulation process. Then, in step S76, the controller 8A determines whether or not the number of demodulation processes has exceeded the predetermined number of demodulations. If YES, then the controller 8A returns to step S41 of FIG. 13; and if NO, then the controller 8A returns to step S73.

Thus, according to the MIMO antenna apparatus of the present preferred embodiment, it is possible to achieve the diversity reception by comparing signal levels and signal qualities of the respective antennas 1a and 2a, and achieve the diversity reception by comparing signal levels and signal qualities of the respective antennas 1b and 2b. In this case, when a signal level of an antenna connected to the A/D converter circuit 5 by one of the switches 4a and 4b is lower than or equal to the threshold value (when NO in step S43, YES in step S51, NO in step S59, or YES in step S67), the controller 8A controls the switch to change a feed point connected to the MIMO demodulator circuit 6, to the other feed point. When the signal quality after the change has not improved over the signal quality before the change (when NO in step S45, S53, S61, or S69), the controller 8A controls the switch to re-connect the antenna previously connected to the A/D converter circuit 5.

Figure 17:
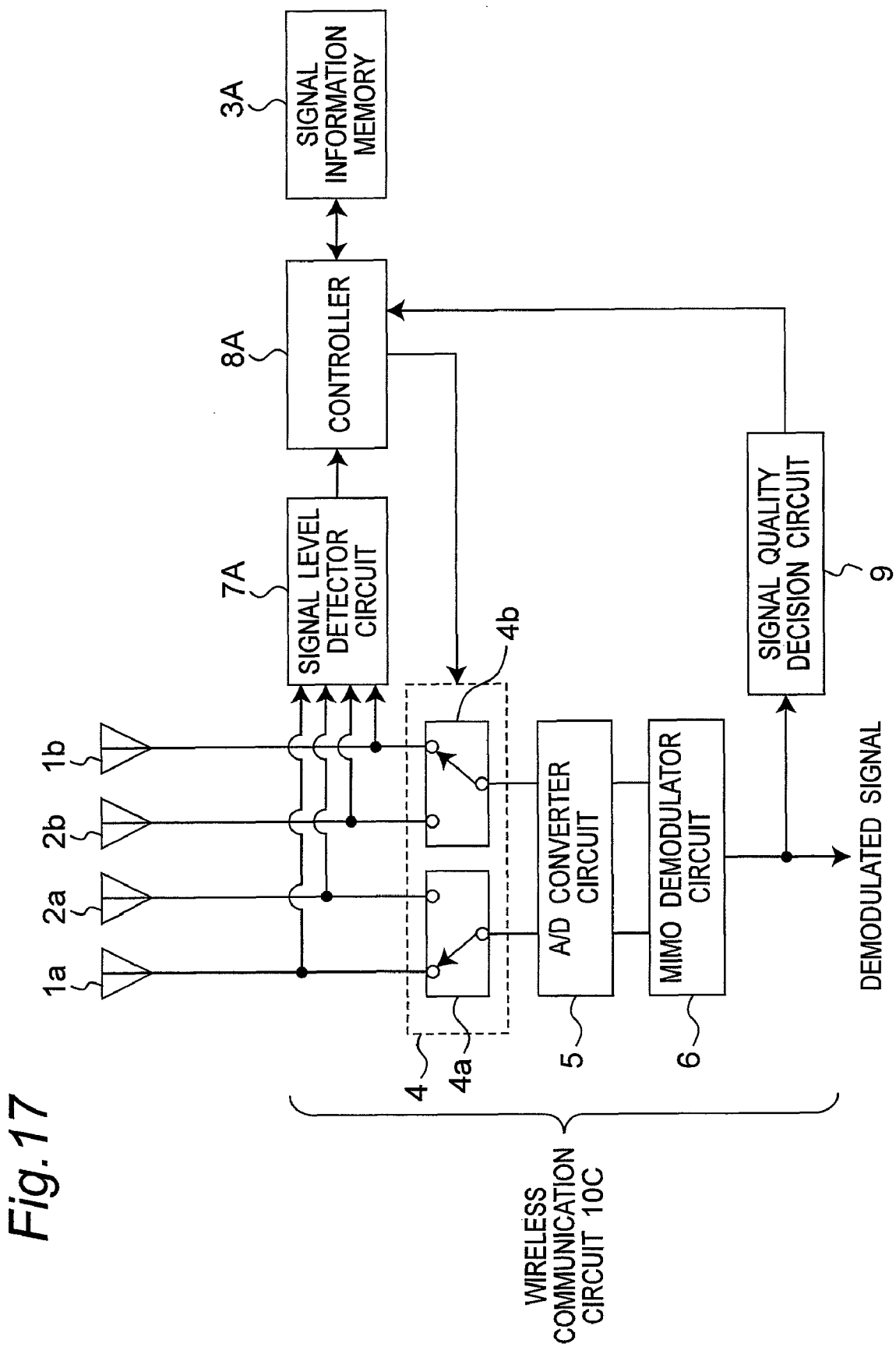
FIG. 17 is a block diagram showing a configuration of a MIMO antenna apparatus according to a first modified preferred embodiment of the second preferred embodiment of the present invention.

FIG. 17 is a block diagram showing a configuration of a MIMO antenna apparatus according to a first modified preferred embodiment of the second preferred embodiment of the present invention. In a manner similar to that of the modified preferred embodiment shown in FIG. 9, the MIMO antenna apparatus of the present preferred embodiment may also be provided with a signal level detector circuit 7A connected to each of antennas 1a, 1b, 2a, and 2b, instead of a signal level detector circuit 7 of FIG. 12.

As described above, according to the MIMO antenna apparatus of the present preferred embodiment, the slits 11a and 11b are used to achieve high isolation between antennas and simultaneously to operate as slit antennas, thus configuring multiple diversity antennas while maintaining high isolation. Accordingly, it is possible to provide a MIMO antenna apparatus capable of stable, high-quality and high-speed communication, and provide a mobile wireless communication apparatus provided with the MIMO antenna apparatus.

Third Preferred Embodiment

Figure 18:
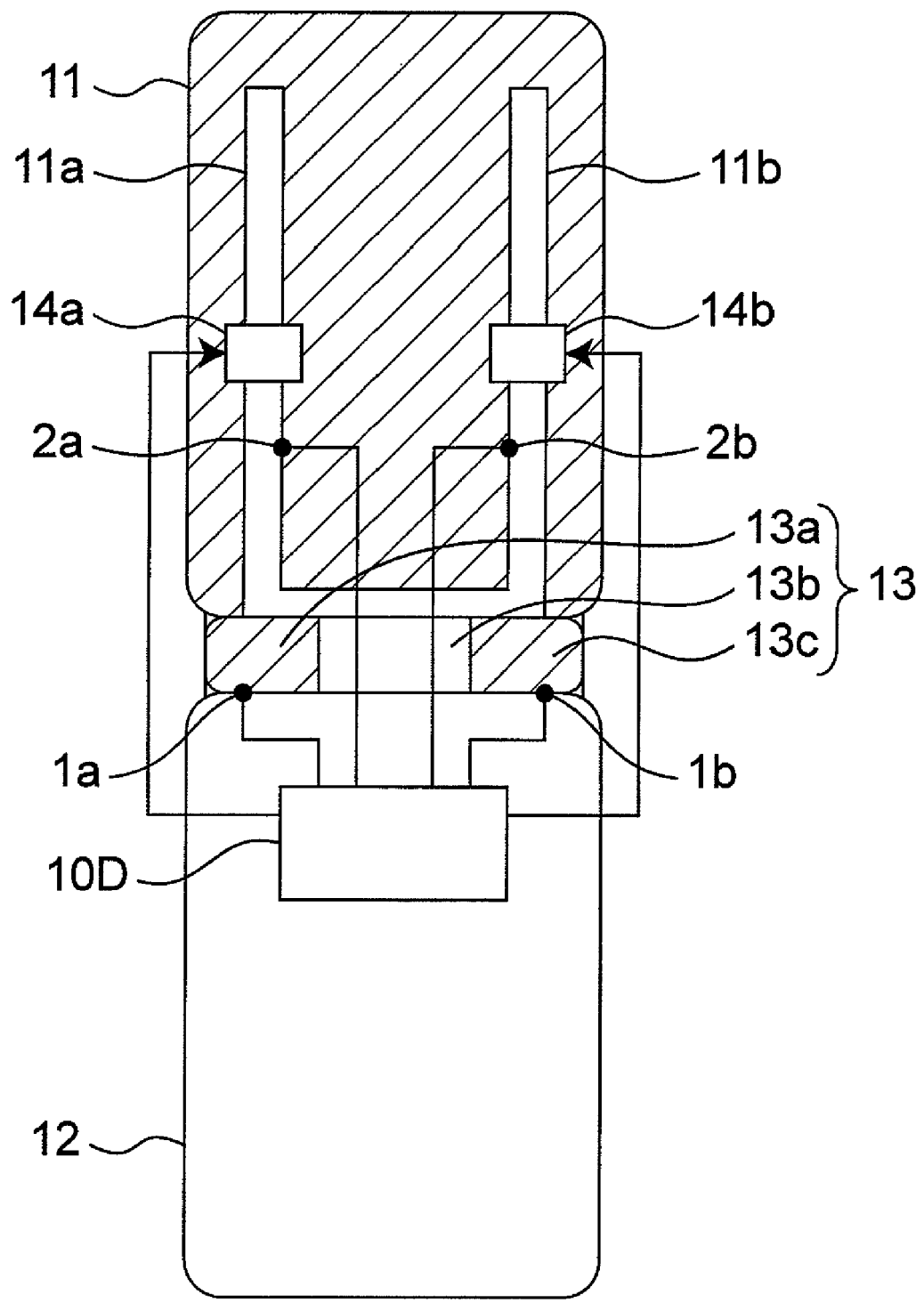
FIG. 18 is a schematic diagram showing an internal configuration of a portable wireless communication apparatus provided with a MIMO antenna apparatus according to a third preferred embodiment of the present invention, by removing a surface of a housing of the portable wireless communication apparatus.

FIG. 18 is a schematic diagram showing an internal configuration of a portable wireless communication apparatus provided with a MIMO antenna apparatus according to a third preferred embodiment of the present invention, by removing a surface of a housing of the portable wireless communication apparatus. The MIMO antenna apparatus of the present preferred embodiment is characterized by having the configuration of a portable wireless communication apparatus provided with a MIMO antenna apparatus shown in FIG. 2, and further having at least one resonant frequency adjuster circuit on at least one of slits 11a and 11b for changing the operating frequency of the MIMO antenna apparatus to a predetermined frequency, i.e., resonant frequency adjuster circuits 14a and 14b. The MIMO antenna apparatus of the present preferred embodiment can perform MIMO wireless communication at a plurality of operating frequencies by a controller (not shown) of a wireless communication circuit 10D controlling the resonant frequency adjuster circuits 14a and 14b.

Figure 19:
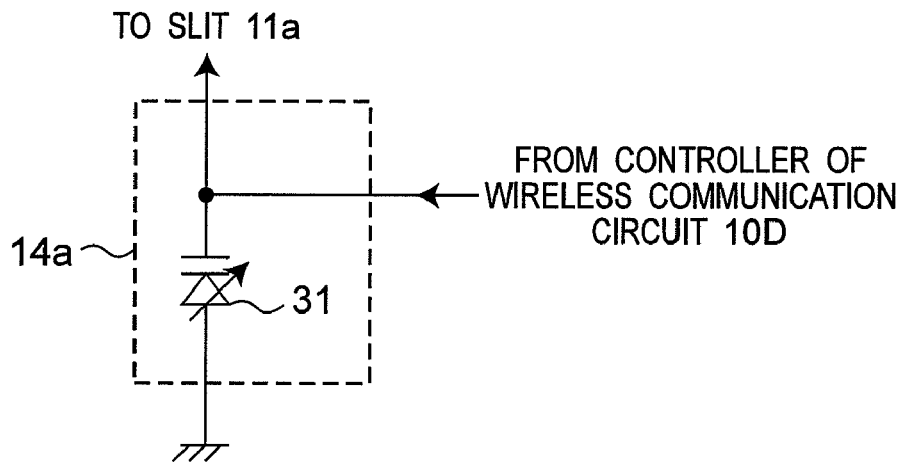
FIG. 19 is a circuit diagram showing a detailed configuration for a first implementation example of a resonant frequency adjuster circuit 14a of FIG. 18.
Figure 20:
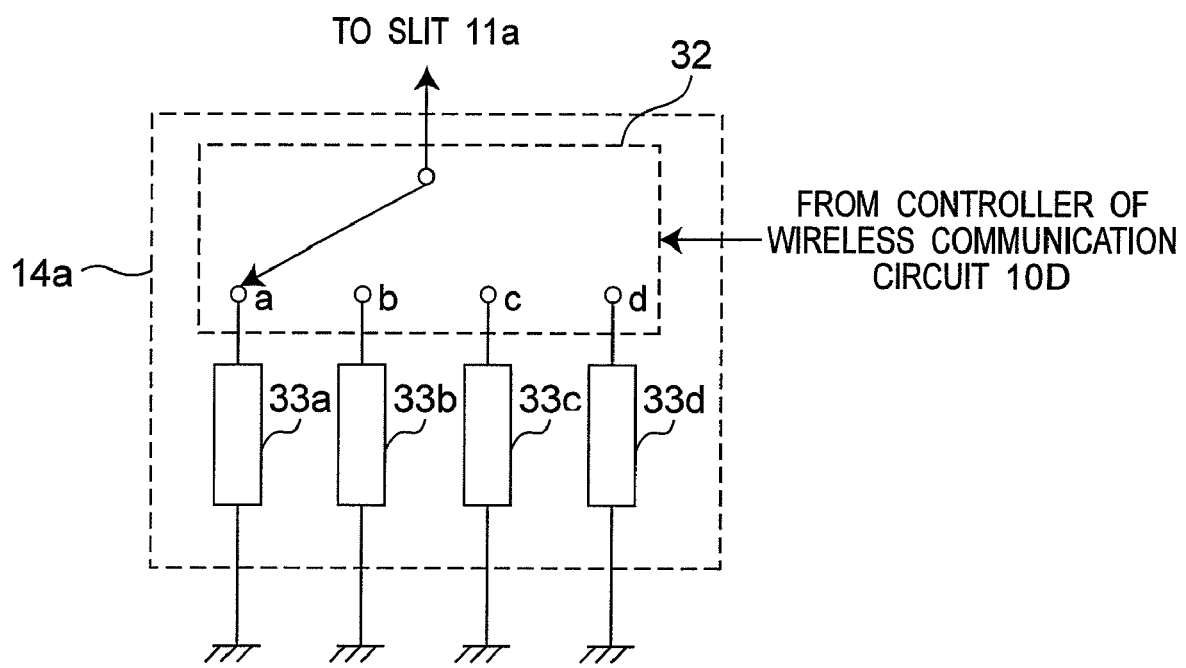
FIG. 20 is a circuit diagram showing a detailed configuration for a second implementation example of the resonant frequency adjuster circuit 14a of FIG. 18.

FIG. 19 is a circuit diagram showing a detailed configuration for a first implementation example of the resonant frequency adjuster circuit 14a of FIG. 18. FIG. 20 is a circuit diagram showing a detailed configuration for a second implementation example of the resonant frequency adjuster circuit 14a of FIG. 18. Each of the resonant frequency adjuster circuits 14a and 14b can be configured using, e.g., as shown in FIG. 19, a variable-capacitance diode 31. The controller of the wireless communication circuit 10D changes a voltage applied to the variable-capacitance diode 31. Further, each of the resonant frequency adjuster circuits 14a and 14b may be configured using other fixed elements (a capacitor or an inductor) or a plurality of variable-capacitance diodes so as to obtain a desired load impedance value. Alternatively, as shown in FIG. 20, each of the resonant frequency adjuster circuits 14a and 14b can also be configured by a switch 32 and a plurality of load impedance components 33a, 33b, 33c, and 33d having different impedance values. The controller of the wireless communication circuit 10D controls the connection of the switch 32. Although FIG. 20 shows an exemplary configuration including four load impedance components 33a, 33b, 33c, and 33d, the configuration is not limited thereto, and may be configured using any number of two or more load impedance components. Each of the load impedances may be configured using a fixed element, or a variable-capacitance diode, or combined circuitry thereof so as to obtain a desired load impedance. With such a configuration, each of the load impedances can be changed in a stepwise manner, or changed continuously over a wide range.

The resonant frequency adjuster circuits 14a and 14b are used to change the resonant frequency of the slits 11a and 11b. These circuits can change the resonant frequency of antennas 2a and 2b as slit antennas, and change a frequency at which high isolation is achieved between antennas 1a and 1b as planar antennas. Therefore, according to the MIMO antenna apparatus of the present preferred embodiment, it is possible to implement an array antenna operable at a plurality of frequencies by means of a single planar conductor or metal housing (i.e., an upper housing 11). That is, there is an advantage of size reduction of a portable terminal. Further, it is possible to operate antennas 1a and 1b in wider band, not only by widen an operating range of a radiating conductor or metal housing itself, which configures the antennas 1a and 1b, but also by providing impedance matching circuits, or using variable reactance elements such as variable-capacitance diodes, in a manner similar to that of the configuration of FIG. 19, or using load impedance components and a switch, in a manner similar to that of the configuration of FIG. 20.

Figure 21:
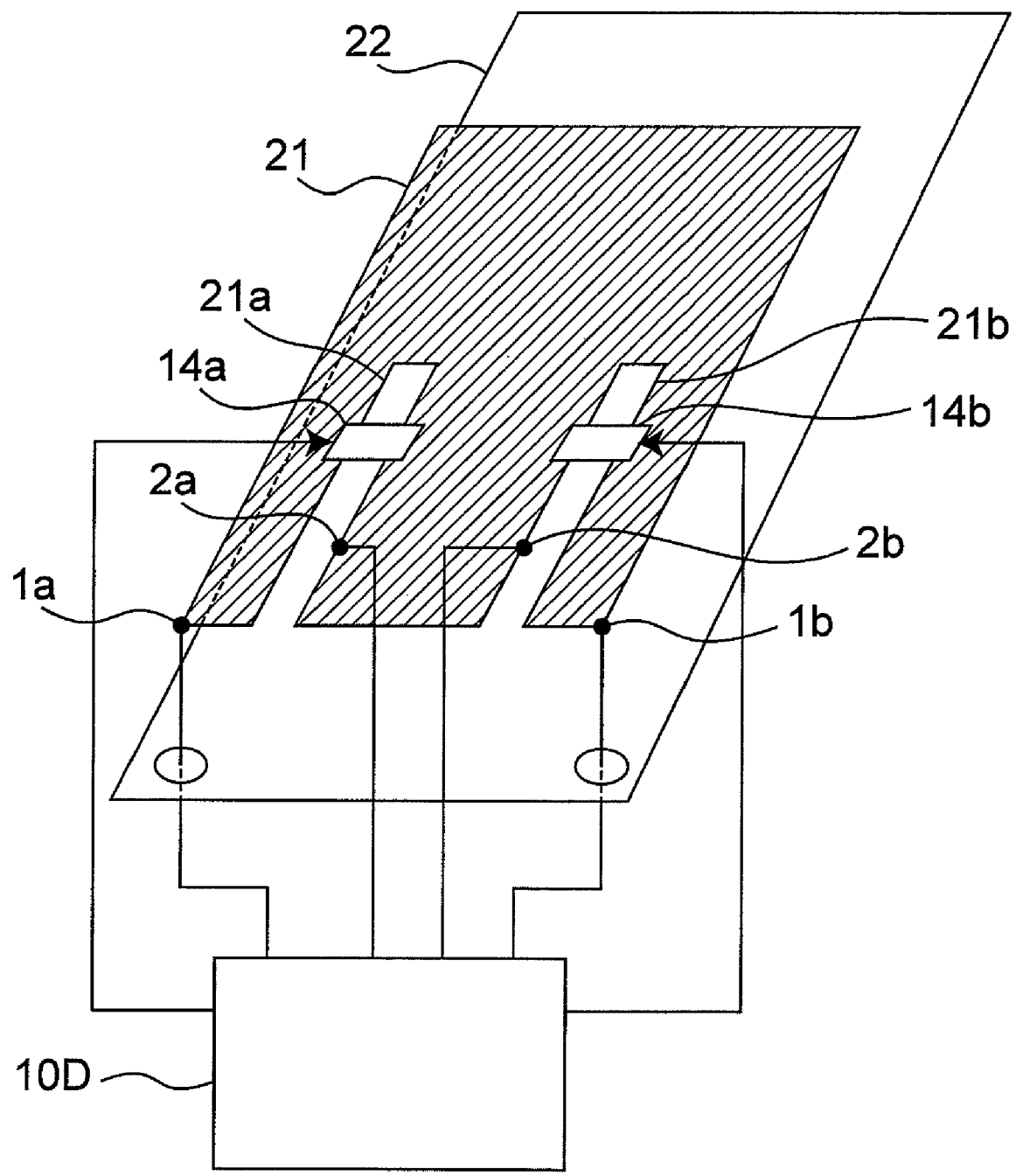
FIG. 21 is a perspective view showing a configuration of a MIMO antenna apparatus according to a first modified preferred embodiment of the third preferred embodiment of the present invention.
Figure 22:
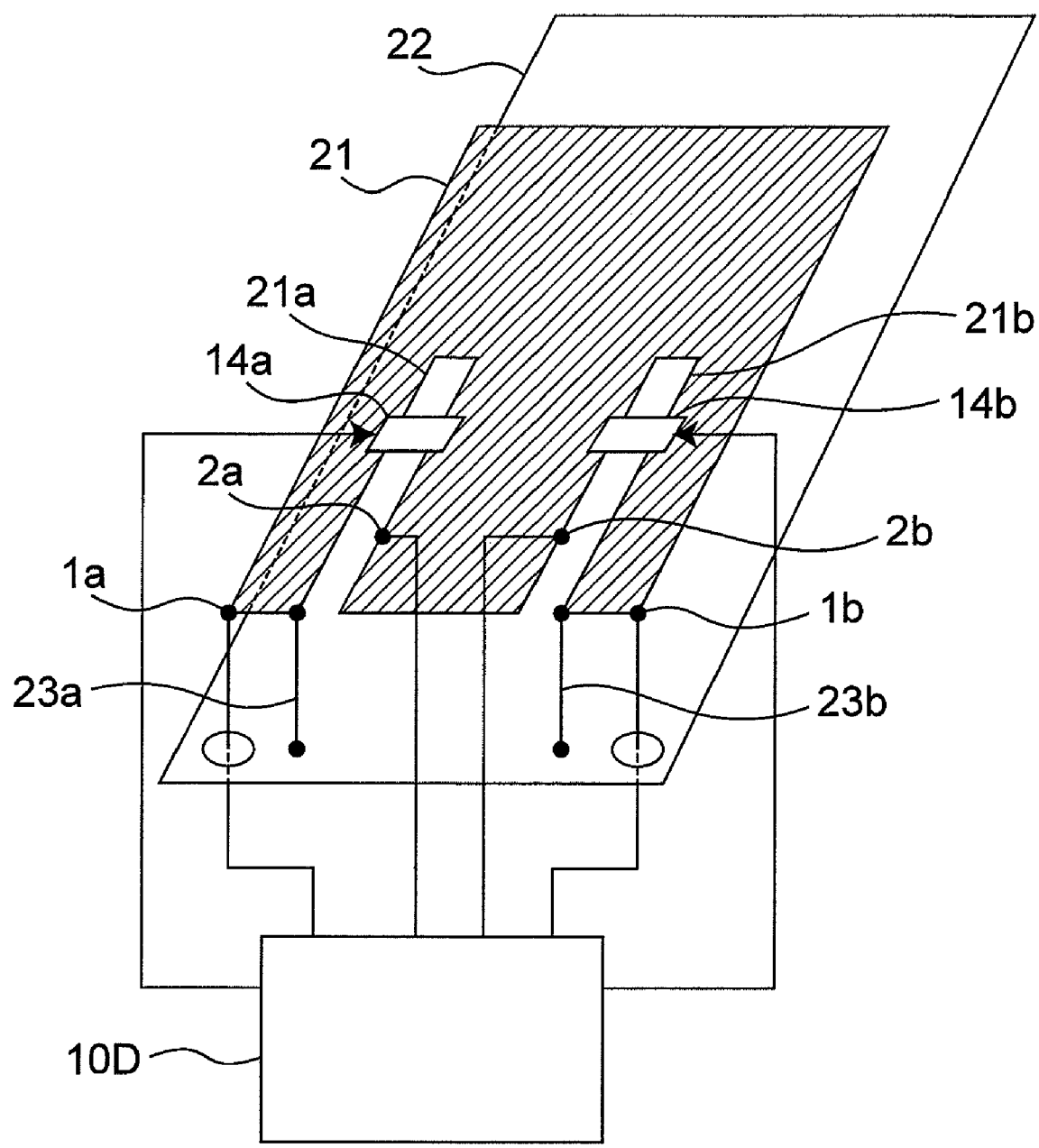
FIG. 22 is a perspective view showing a configuration of a MIMO antenna apparatus according to a second modified preferred embodiment of the third preferred embodiment of the present invention.

FIG. 21 is a perspective view showing a configuration of a MIMO antenna apparatus according to a first modified preferred embodiment of the third preferred embodiment of the present invention. FIG. 22 is a perspective view showing a configuration of a MIMO antenna apparatus according to a second modified preferred embodiment of the third preferred embodiment of the present invention. Although FIG. 18 shows a foldable mobile phone as an example, the preferred embodiment is not limited thereto, and in a manner similar to that of FIGS. 10 and 11, the MIMO antenna apparatus may be configured as a planar inverted-L antenna (FIG. 21) or a planar inverted-F antenna (FIG. 22). These configurations have an advantage that a radiating conductor plate 21 of any shape can be used for configuring a portable wireless communication apparatus provided with a MIMO antenna apparatus, without restrictions imposed by a housing shape of the portable wireless communication apparatus.

Moreover, it is also possible to provide a MIMO antenna apparatus as a combination of the second and third preferred embodiments. In this case, as in FIG. 12 or 17, a demodulated signal outputted from a MIMO demodulator circuit 6 is inputted to a signal quality decision circuit 9, and the signal quality decision circuit 9 decides a bit error rate (BER) of the demodulated signal as a reference indicative of the signal quality of the demodulated signal, and outputs information on the decision result to a controller of a wireless communication circuit 10D. As the signal quality, a packet error rate or a throughput (e.g., represented by a rate of received data) may be used, instead of a bit error rate (BER). The controller of the wireless communication circuit 10D performs a MIMO adaptive control process of FIGS. 13 to 16 to control a switching circuit 4, based on information on signal levels and signal qualities, thus achieving the diversity reception for changing antennas 1a, 1b, 2a, and 2b from one another.

Thus, according to the MIMO antenna apparatus of the present preferred embodiment, the slits 11a and 11b are used to achieve high isolation between antennas and simultaneously to operate as slit antennas, thus configuring multiple diversity antennas while maintaining high isolation. Accordingly, it is possible to provide a MIMO antenna apparatus capable of stable, high-quality and high-speed communication, and provide a mobile wireless communication apparatus provided with the MIMO antenna apparatus.

INDUSTRIAL APPLICABILITY

As described in detail above, according to MIMO antenna apparatuses of the preferred embodiments, it is possible to provide MIMO antenna apparatuses capable of high-quality and high-speed communication even in a small size, by ensuring high isolation between antenna elements and simultaneously implementing a diversity configuration, and provide mobile wireless communication apparatuses provided with the MIMO antenna apparatuses.

REFERENCE SIGNS LIST 1a, 1b, 2a, 2b: antenna,
3, 3A: signal information memory,
4: switch circuit,
4a, 4b: switch,
5: A/D converter circuit,
6: MIMO demodulator circuit
7, 7A: signal level detector circuit,
8, 8A: controller,
9: signal quality decision circuit,
10, 10A, 10B, 10C, 10D: wireless communication circuit,
11: upper housing,
11a, 11b, 21a, 21b: slit,
12: lower housing,
13: hinge portion,
13a: left hinge portion,
13b: central hinge portion,
13c: right hinge portion,
14a, 14b: resonant frequency adjuster circuit,
21: radiating conductor plate,
22: ground conductor plate,
23a, 23b: short-circuit conductor,
31: variable-capacitance diode,
32: switch,
33a, 33b, 33c, 33d: load impedance element.

The invention claimed is:
1. A MIMO antenna apparatus comprising:
a radiating conductor having a plurality of slits;
a plurality of first feed points which are respectively provided on the radiating conductor, and through which the radiating conductor itself is excited as a plurality of different first antennas, respectively;

a plurality of second feed points which are respectively provided at the plurality of slits, and through which the plurality of slits are excited as a plurality of second antennas, respectively;

a demodulator circuit for demodulating received radio signals by a MIMO (Multi-Input Multi-Output) scheme;

a switching circuit including a plurality of switches, each switch connected to one of the first feed points and one of the second feed points, the switching circuit connecting one of two feed points connected to each switch, to the demodulator circuit; and a controller for controlling the switches based on a first and a second signal measurement values of respective received radio signals, wherein, when the first signal measurement value of a radio signal received by an antenna associated with a feed point currently connected to the demodulator circuit by a first switch, which is any one of the switches, is less than or equal to a predetermined threshold value, the controller controls the first switch to change the feed point connected to the demodulator circuit, to the other feed point, and when the second signal measurement value after the change of the feed point has not improved over the second signal measurement value before the change of the feed point, the controller controls the first switch to change again the feed point connected to the demodulator circuit, to the other feed point.

2. The MIMO antenna apparatus as claimed in claim 1, wherein at least one of the slits is located between at least two of the first antennas.

3. The MIMO antenna apparatus as claimed in claim 2, wherein the controller controls the switches to initially connect the first feed points to the demodulator circuit.

4. The MIMO antenna apparatus as claimed in claim 1, further comprising a detector circuit for detecting signal levels of radio signals respectively received by antennas associated with feed points currently connected to the demodulator circuit by the switches, wherein the first and the second signal measurement values are signal levels detected by the detector circuit.

5. The MIMO antenna apparatus as claimed in claim 1, further comprising a detector circuit for detecting signal levels of radio signals respectively received by the first and second antennas, wherein the first and the second signal measurement values are signal levels detected by the detector circuit.

6. The MIMO antenna apparatus as claimed in claim 1, further comprising:

a detector circuit for detecting signal levels of radio signals respectively received by antennas associated with feed points currently connected to the demodulator circuit by the switches; and a decision circuit for deciding signal quality of the radio signals demodulated by the demodulator circuit, wherein the first signal measurement value is a signal level detected by the detector circuit, and wherein the second signal measurement value is signal quality decided by the decision circuit.

7. The MIMO antenna apparatus as claimed in claim 1, further comprising:

a detector circuit for detecting signal levels of radio signals respectively received by the first and second antennas; and a decision circuit for deciding signal quality of the radio signals demodulated by the demodulator circuit, wherein the first signal measurement value is a signal level detected by the detector circuit, and wherein the second signal measurement value is signal quality decided by the decision circuit.

8. The MIMO antenna apparatus as claimed in claim 1, wherein at least one of the slits has a resonant frequency adjuster for changing an operating frequency of the MIMO antenna apparatus to a predetermined frequency.

9. The MIMO antenna apparatus as claimed in claim 1, further comprising a ground conductor, wherein the radiating conductor configures one of a planar inverted-F antenna and a planar inverted-L antenna, on the ground conductor.

10. A wireless communication apparatus comprising a MIMO antenna apparatus, the MIMO antenna apparatus comprising:

a radiating conductor having a plurality of slits;

a plurality of first feed points which are respectively provided on the radiating conductor, and through which the radiating conductor itself is excited as a plurality of different first antennas, respectively;

a plurality of second feed points which are respectively provided at the plurality of slits, and through which the plurality of slits are excited as a plurality of second antennas, respectively;

a demodulator circuit for demodulating received radio signals by a MIMO (Multi-Input Multi-Output) scheme;

a switching circuit including a plurality of switches, each switch connected to one of the first feed points and one of the second feed points, the switching circuit connecting one of two feed points connected to each switch, to the demodulator circuit; and a controller for controlling the switches based on a first and a second signal measurement values of respective received radio signals, wherein, when the first signal measurement value of a radio signal received by an antenna associated with a feed point currently connected to the demodulator circuit by a first switch, which is any one of the switches, is less than or equal to a predetermined threshold value, the controller controls the first switch to change the feed point connected to the demodulator circuit, to the other feed point, and when the second signal measurement value after the change of the feed point has not improved over the second signal measurement value before the change of the feed point, the controller controls the first switch to change again the feed point connected to the demodulator circuit, to the other feed point.

11. The wireless communication apparatus as claimed in claim 10, wherein the wireless communication apparatus is a mobile phone.

* * * * *